United States Patent
Bastola et al.

(10) Patent No.: US 11,886,009 B2
(45) Date of Patent: Jan. 30, 2024

(54) COATING FUSION SPLICED OPTICAL FIBERS AND SUBSEQUENT PROCESSING METHODS THEREOF

(71) Applicant: CORNING RESEARCH & DEVELOPMENT CORPORATION, Corning, NY (US)

(72) Inventors: Anil Bastola, Fort Worth, TX (US); Wei Liu, Sterling, TX (US); Randy LaRue McClure, Corning, NY (US); Chad Charles Terwilliger, Lindley, NY (US); Elizabeth Tran, Painted Post, NY (US); Chanh Cuong Vo, Fort Worth, TX (US); Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 129 days.

(21) Appl. No.: 17/481,626

(22) Filed: Sep. 22, 2021

(65) Prior Publication Data

US 2022/0107462 A1  Apr. 7, 2022

Related U.S. Application Data

(60) Provisional application No. 63/086,325, filed on Oct. 1, 2020.

(51) Int. Cl.
*G02B 6/255* (2006.01)
*C03C 25/105* (2018.01)
*C03C 25/26* (2018.01)

(52) U.S. Cl.
CPC .......... *G02B 6/2558* (2013.01); *C03C 25/105* (2013.01); *C03C 25/26* (2013.01); *G02B 6/2551* (2013.01)

(58) Field of Classification Search
CPC .. G02B 6/2558; G02B 6/2551; C03C 25/105; C03C 25/26
See application file for complete search history.

(56) References Cited

U.S. PATENT DOCUMENTS

| | | |
|---|---|---|
| 4,018,983 A | 4/1977 | Pedlow |
| 4,077,702 A | 3/1978 | Kunze et al. |
| 4,254,865 A | 3/1981 | Pacey et al. |
| 4,509,820 A | 4/1985 | Murata et al. |
| 4,537,468 A | 8/1985 | Degoix et al. |

(Continued)

FOREIGN PATENT DOCUMENTS

| | | |
|---|---|---|
| CN | 1548492 A | 11/2004 |
| CN | 1735825 A | 2/2006 |

(Continued)

OTHER PUBLICATIONS

Duke et al; "Benefits of CO2 Laser Heating for High Reliability Fiber Splicing," Proc. SPIE 735, pp. B1-B12, 2016.

(Continued)

*Primary Examiner* — Ryan A Lepisto
*Assistant Examiner* — Erin D Chiem

(57) ABSTRACT

The present disclosure relates to a polymeric overcoating used as a splice protector, and a corresponding method of application where the resulting coated fusion spliced optical fibers or coated fusion spliced optical fiber ribbons can be bundled or stacked to reduce the size of splice protection.

22 Claims, 17 Drawing Sheets

(56) References Cited

U.S. PATENT DOCUMENTS

| | | | |
|---|---|---|---|
| 4,714,316 A | 12/1987 | Moore et al. | |
| 4,778,242 A | 10/1988 | Ota et al. | |
| 4,786,138 A | 11/1988 | Buckley | |
| 4,812,010 A | 3/1989 | Osaka et al. | |
| 4,865,411 A | 9/1989 | Darsey et al. | |
| 4,878,732 A | 11/1989 | Rohner et al. | |
| 4,923,274 A | 5/1990 | Dean | |
| 5,022,735 A | 6/1991 | Dahlgren | |
| 5,066,091 A * | 11/1991 | Stoy | B29C 61/003 385/98 |
| 5,093,048 A | 3/1992 | Kagan | |
| 5,212,756 A | 5/1993 | Eoll | |
| 5,231,688 A | 7/1993 | Zimmer | |
| 5,247,598 A | 9/1993 | Takimoto et al. | |
| 5,360,464 A | 11/1994 | Yamauchi et al. | |
| 5,367,591 A | 11/1994 | Seike et al. | |
| 5,416,873 A | 5/1995 | Huebscher et al. | |
| 5,477,507 A | 12/1995 | Kaplan | |
| 5,682,454 A | 10/1997 | Gaillard | |
| 5,720,908 A | 2/1998 | Gaillard | |
| 5,731,051 A | 3/1998 | Fahey et al. | |
| 5,832,162 A | 11/1998 | Sarbell | |
| 6,099,170 A | 8/2000 | Sarbell | |
| 6,152,611 A | 11/2000 | Mardirossian et al. | |
| 6,282,353 B1 | 8/2001 | Clark | |
| 6,295,400 B1 | 9/2001 | Shahid | |
| 6,360,044 B1 | 3/2002 | Mills et al. | |
| 6,367,990 B1 | 4/2002 | Dumitriu | |
| 6,421,493 B1 | 7/2002 | Burek et al. | |
| 6,454,471 B1 | 9/2002 | Ware et al. | |
| 6,485,199 B1 | 11/2002 | Ware et al. | |
| 6,614,971 B2 | 9/2003 | Sun et al. | |
| 6,676,299 B1 | 1/2004 | Durrant et al. | |
| 6,728,451 B2 | 4/2004 | Kordahi | |
| 6,738,555 B1 | 5/2004 | Cooke et al. | |
| 6,742,705 B1 | 6/2004 | Clark | |
| 6,771,961 B2 | 8/2004 | Bamburak et al. | |
| 6,869,227 B2 | 3/2005 | Del et al. | |
| 7,118,035 B2 | 10/2006 | Clark | |
| 7,181,111 B2 | 2/2007 | Ahrens | |
| 7,364,375 B1 | 4/2008 | Jones | |
| 7,461,981 B2 | 12/2008 | Yow et al. | |
| 7,901,147 B1 | 3/2011 | De et al. | |
| 7,903,925 B2 | 3/2011 | Cooke et al. | |
| 8,047,726 B2 | 11/2011 | Tamekuni et al. | |
| 8,096,712 B2 | 1/2012 | Solomon et al. | |
| 8,388,242 B2 | 3/2013 | Kachmar et al. | |
| 8,408,811 B2 | 4/2013 | De et al. | |
| 8,408,818 B2 | 4/2013 | Homma | |
| 8,548,294 B2 | 10/2013 | Toge et al. | |
| 8,573,855 B2 | 11/2013 | Nhep | |
| 8,696,221 B2 | 4/2014 | Vastmans et al. | |
| 8,702,326 B2 | 4/2014 | Faulkner et al. | |
| 8,740,479 B2 | 6/2014 | Shitama et al. | |
| 8,787,718 B2 * | 7/2014 | Tanabe | G02B 6/4403 385/102 |
| 8,824,841 B1 | 9/2014 | Mullen | |
| 8,915,659 B2 | 12/2014 | Marcouiller et al. | |
| 8,944,411 B2 | 2/2015 | Cooke et al. | |
| 8,958,673 B2 | 2/2015 | Cline et al. | |
| 9,063,286 B2 | 6/2015 | Durrant et al. | |
| 9,089,931 B1 | 7/2015 | Carberry et al. | |
| 9,167,626 B1 | 10/2015 | Wu | |
| 9,360,624 B2 | 6/2016 | Faulkner et al. | |
| 9,389,382 B2 | 7/2016 | Blazer et al. | |
| 9,604,261 B2 | 3/2017 | Wu | |
| 9,857,548 B2 | 1/2018 | Nielsen et al. | |
| 9,933,572 B2 | 4/2018 | Akiyama et al. | |
| 9,939,599 B2 | 4/2018 | Blazer et al. | |
| 10,018,782 B2 | 7/2018 | Wu | |
| 10,185,110 B2 | 1/2019 | Kaneko et al. | |
| 10,209,447 B2 | 2/2019 | Filipowicz et al. | |
| 10,254,500 B2 | 4/2019 | Lu et al. | |
| 10,353,154 B2 | 7/2019 | Ott et al. | |
| 10,658,790 B2 | 5/2020 | Finona | |
| RE48,144 E | 8/2020 | Faulkner et al. | |
| 10,976,492 B2 | 4/2021 | Wu | |
| 10,989,888 B2 * | 4/2021 | Debban | B05D 1/02 |
| 2002/0003934 A1 | 1/2002 | Clark | |
| 2003/0016923 A1 | 1/2003 | Summers et al. | |
| 2003/0103743 A1 | 6/2003 | Sun et al. | |
| 2004/0062480 A1 | 4/2004 | Cronk et al. | |
| 2004/0218891 A1 | 11/2004 | Clark | |
| 2005/0238313 A1 | 10/2005 | Clark | |
| 2005/0271338 A1 | 12/2005 | Livingston | |
| 2006/0093281 A1 | 5/2006 | Kesler | |
| 2009/0103870 A1 | 4/2009 | Solomon et al. | |
| 2011/0110635 A1 | 5/2011 | Toge et al. | |
| 2011/0311185 A1 | 12/2011 | Kachmar et al. | |
| 2012/0020630 A1 | 1/2012 | Vastmans et al. | |
| 2012/0243838 A1 | 9/2012 | Sato et al. | |
| 2012/0281951 A1 | 11/2012 | Takahashi et al. | |
| 2013/0074303 A1 | 3/2013 | Durrant et al. | |
| 2013/0251317 A1 | 9/2013 | Faulkner et al. | |
| 2013/0302003 A1 | 11/2013 | Bookbinder et al. | |
| 2014/0286615 A1 | 9/2014 | Faulkner et al. | |
| 2014/0321813 A1 | 10/2014 | Lu | |
| 2015/0110450 A1 | 4/2015 | Jones et al. | |
| 2015/0253503 A1 | 9/2015 | Saito et al. | |
| 2015/0346445 A1 | 12/2015 | Blazer et al. | |
| 2016/0116683 A1 | 4/2016 | Murashima et al. | |
| 2016/0161672 A1 | 6/2016 | Bauco et al. | |
| 2016/0299306 A1 | 10/2016 | Mcalpine et al. | |
| 2016/0299310 A1 | 10/2016 | Kaneko et al. | |
| 2016/0349453 A1 | 12/2016 | Wu | |
| 2017/0001224 A1 | 1/2017 | Wu | |
| 2017/0010433 A1 | 1/2017 | Nielsen et al. | |
| 2017/0031121 A1 | 2/2017 | Blazer et al. | |
| 2018/0011262 A1 | 1/2018 | Chabot et al. | |
| 2018/0024294 A1 | 1/2018 | Wang et al. | |
| 2018/0210152 A1 | 7/2018 | Giotto et al. | |
| 2018/0351292 A1 | 12/2018 | Finona | |
| 2019/0137689 A1 | 5/2019 | Filipowicz et al. | |
| 2020/0012047 A1 | 1/2020 | Wu | |
| 2020/0012054 A1 | 1/2020 | Ott et al. | |
| 2020/0081186 A1 | 3/2020 | Wu | |
| 2021/0302656 A1 | 9/2021 | Wu | |

FOREIGN PATENT DOCUMENTS

| | | |
|---|---|---|
| CN | 202494801 U | 10/2012 |
| DE | 202007013173 U1 | 12/2007 |
| EP | 0057828 A1 | 8/1982 |
| EP | 0278423 A2 | 8/1988 |
| EP | 0537413 A1 | 4/1993 |
| EP | 1168018 A2 | 1/2002 |
| JP | 55-103513 A | 8/1980 |
| JP | 55-129305 A | 10/1980 |
| JP | 56-022405 A | 3/1981 |
| JP | 58-147707 A | 9/1983 |
| JP | 59-037515 A | 3/1984 |
| JP | 62-015504 A | 1/1987 |
| JP | 05-233859 A | 9/1993 |
| JP | 11-326677 A | 11/1999 |
| JP | 2001-147340 A | 5/2001 |
| JP | 2004-347801 A | 12/2004 |
| JP | 2005-250294 A | 9/2005 |
| JP | 2009-163165 A | 7/2009 |
| JP | 2011-232375 A | 11/2011 |
| JP | 5233859 B2 | 7/2013 |
| WO | 2001/027673 A1 | 4/2001 |
| WO | 2004/040347 A1 | 5/2004 |
| WO | 2009/040271 A2 | 4/2009 |
| WO | 2011/112764 A1 | 9/2011 |
| WO | 2013/007969 A2 | 1/2013 |
| WO | 2013/126429 A2 | 8/2013 |
| WO | 2018/175122 A1 | 9/2018 |

(56) References Cited

FOREIGN PATENT DOCUMENTS

| WO | WO-2018175122 A1 * | 9/2018 | ............ G02B 6/2558 |
| WO | 2020/219477 A1 | 10/2020 | |

OTHER PUBLICATIONS

European Patent Application No. 21199596.4, Extended European Search Report dated Dec. 20, 2021; 10 pages; European Patent Office.

Friebele et al; "Method for Recoating Optical Fibres With Polyimide," Electron. Lett, 34, pp. 1249-1250, 1998.

Glaesemann et al; "The Mechanical Reliability of Corning Optical Fiber in Small Bend Scenarios" ; Corning; ISO 9001 Registered; (2007) 8 Pages.

Matsumoto et al; "Design and Characteristics of Reinforcement Method for Fusion Spliced Optical Fiber," J_ Lightwave Technol., LT-3, pp. 322-327, 1985.

Serafini.; "Compact and Reliable Protection of Single-Fiber and Ribbon-Fiber Fusion Splices" Proc. SPIE 1973, pp. 306-315 1993.

Trunk et al.; "Protection With Heat-Shrinkable Sleeves for Optical Fiber Arc Fusion Splicing," Proc. SPIE 1365, Components for Fiber Optic Applications V, pp. 124-130, 1990.

Volotinen et al; "Effect of Mechanical Stripping and Arc-Fusion on the Strength and Aging of a Spliced Recoated Optical Fiber," Mat. Res. Soc. Symp. Proc. 531, pp. 163-168, 1998.

Wood, "Reliability of Optical Connectors and Splices", Proc. SPIE 2074, pp. 276-287, 1994.

Yablon, A.O.; "Optical Fiber Fusion Splicing," Springer, 2005; pp. 161-180.

Yamada et al., "Arc Fusion Splicer With Profile Alignment System for High-strength Low-loss Optical Submarine Cable", Journal of Lightwave Technology, vol. 4, No. 8, Aug. 1986, pp. 1204-1210.

* cited by examiner

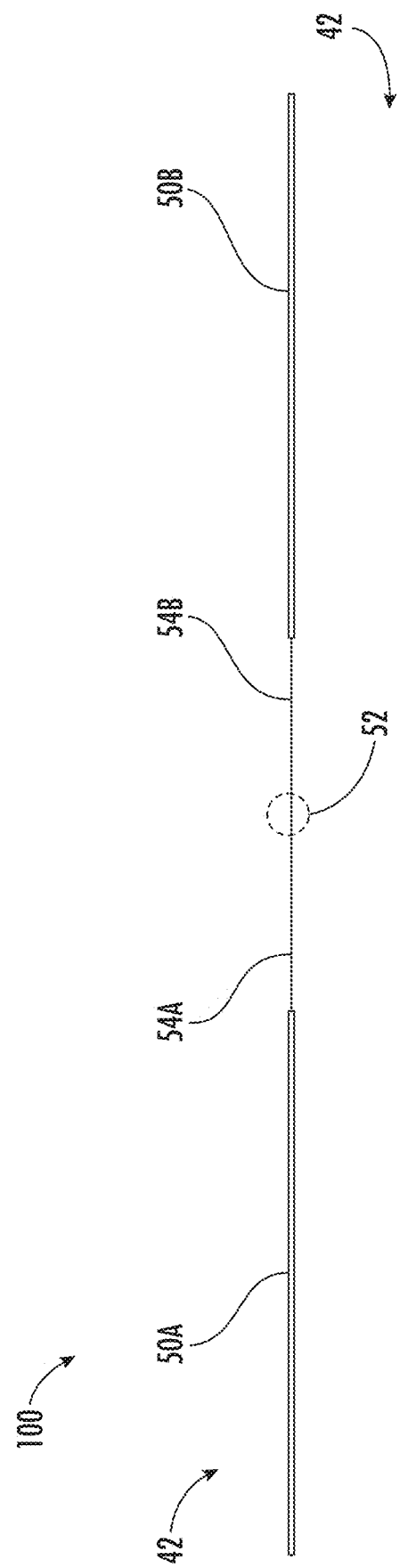

COATING FUSION SPLICED OPTICAL FIBERS AND SUBSEQUENT PROCESSING METHODS THEREOF

PRIORITY APPLICATION

This application claims the benefit of priority of U.S. Provisional Application No. 63/086,325, filed on Oct. 1, 2020, the content of which is relied upon and incorporated herein by reference in its entirety.

FIELD OF THE DISCLOSURE

This disclosure relates to a coating method for splice protection of fusion spliced optical fibers and more particularly, to a UV coating method for splice protection that allows coated fusion spliced optical fibers to be bundled and/or stacked.

BACKGROUND OF THE DISCLOSURE

Optical fibers are useful in a wide variety of applications, including the telecommunications industry for voice, video, and data transmission. In a telecommunications system that uses optical fibers, there are typically many locations where fiber optic cables, which carry the optical fibers, connect to equipment or other fiber optic cables. Optical cables are frequency produced by extruding thermoplastic material (e.g., polyvinylchloride (PVC)) over at least one coated optical fiber.

Optical fiber fusion splicing is the process by which a permanent, low-loss, high-strength, fused (or welded) joint is formed between two optical fibers. The ultimate goal of optical fiber fusion splicing is to create a joint with no optical loss, yet with mechanical strength and long-term reliability that matches an unspliced continuous fiber. As compared to competing approaches for interconnecting optical fibers (e.g., connectorization, mechanical splicing, or free-space optical coupling), fusion splice joints are compact and may exhibit a cross-sectional area comparable to that of an unspliced optical fiber. Fusion splices are permanent in character, and may exhibit high mechanical strength, high alignment stability, and good tolerance to high temperatures and/or high optical power densities. Fusion splices also disallow entry of dust or contaminants into the optical path once fused.

Optical fiber fusion splicing is practiced in a variety of environments by diverse groups of professionals using a variety of splicing equipment. Three general categories of fusion splicing include: (1) field splicing, (2) factory (or OEM) splicing, and (3) laboratory splicing. Examples of field splicing include utilization of a commercial splicer to fusion splice optical cables in telecommunication networks, and the assembly of undersea fiber optic cables aboard fiber deployment ships. Examples of factory or OEM splicing include the assembly of optical amplifiers (e.g., erbium-doped fiber amplifiers (EDFAs)) and dispersion-compensating modules in a production environment. Laboratory splicing may be performed by researchers using specially designed or modified fusing splicing equipment.

FIG. 1 is a cross-sectional view of an exemplary coated optical fiber 10 that may be subject to fusion splicing. The coated optical fiber 10 includes a glass core 12, glass cladding 14 surrounding the glass core 12, and a multi-layer polymer coating 20 (including an inner primary coating layer 16 and an outer secondary coating layer 18) surrounding the glass cladding 14. The inner primary coating layer 16 may be configured to act as a shock absorber to minimize attenuation caused by any micro-bending of the coated optical fiber 10. The outer secondary coating layer 18 may be configured to protect the inner primary coating layer 16 against mechanical damage, and to act as a barrier to lateral forces. The outer diameter of the coated optical fiber 10 may be about 200 µm, about 250 µm, or any other suitable value. Optionally, an ink layer (e.g., having a thickness of about 5 µm) may be arranged over the secondary coating layer 18 of the coated optical fiber 10 to color the fiber (e.g., as is commonly used in ribbonized fibers), or a coloring agent may be mixed with the coating material that forms the secondary coating layer 18. An additional coating (not shown), which may be embodied in a tight buffer layer or a loose tube (also known as a furcation tube), may be applied to the coated fiber 10 to provide additional protection and allow for easier handling. Such optical fibers including this additional coating layer (e.g., buffered optical fibers or furcated optical fibers) typically have an outer diameter of about 900 µm.

Optical fiber fusion splicing typically includes multiple tasks. First, polymer coatings (e.g., coating layers 16, 18 shown in FIG. 1) of coated optical fibers (e.g., coated optical fiber 10 shown in FIG. 1) are stripped to expose glass cladding (e.g., glass cladding 14 shown in FIG. 1). Next, flat fiber end faces are formed, typically by cleaving exposed glass portions of the fibers. Then the fibers are laterally aligned to each other. The fiber tips must be heated to their softening point and pressed together to form a joint. Checks such as loss estimation and proof testing (to ensure long term mechanical reliability) may be performed. The completed splice must also be protected from the environment by packaging it.

Packaging for fusion splices shields fiber surfaces from mechanical degradation (e.g., abrasion) and chemical degradation (e.g., humidity) to ensure that splices exhibit long-term reliability. Optical fibers must typically be able to withstand service temperatures spanning at least a range of from −40° C. to 85° C. without suffering significant mechanical and/or optical performance degradation. A desirable fusion splice package should be relatively inexpensive, easy and quick to apply, resistant to thermal cycling, and compact in size. Moreover, a desirable fusion splice package should impart minimal geometric distortion to the splice, and should minimize mechanical loads (e.g., tensile, bending, or torsion loads) applied to the splice. Various splice protection strategies have been developed to address these concerns, segregated into two general categories: (1) splice protectors, which are typically rigid in character, and (2) recoats. Examples of conventional splice protectors include (i) heat shrink protection sleeves with integrated strength members (e.g., splints), and (ii) hard plastic (e.g., clam-shell type) cases, which serve to transfer mechanical loads across the splice joint. A recoat restores a flexible polymer coating onto a bare fusion splice, whereby the mechanical integrity of the splice depends on the fusion splice itself.

A heat shrink protection sleeve includes an outer heat shrink tube (typically made of a heat shrinkable material (e.g., a polyolefin) and/or a non-stick material (e.g., polytetrafluoroethylene (PTFE)), an inner thermoplastic tube typically made of a melt flow adhesive material (e.g., ethylene vinyl acetate (EVA)), and a stainless steel rod serving as the strength member or splint. When heated in an oven (e.g., associated with a fusion splicing tool), the thermoplastic tube melts and is compressed around the fiber and the stainless steel rod by the heat shrink tube, forming a hermetic seal around the fusion splice region.

FIG. 2 illustrates a first exemplary heat shrink protection sleeve 28 that includes an outer heat shrink tube 26 that contains an integrated steel strength member 24 (e.g., a stainless steel rod or splint) and an inner thermoplastic tube 22, with the coated optical fiber 10 of FIG. 1 arranged within the inner thermoplastic tube 22. The inner primary coating layer 16 and outer secondary coating layer 18 of the multilayer polymer coating 20 are not illustrated in FIG. 2 to simplify the drawing. The outer heat shrink tube 26 and the inner thermoplastic tube 22 are shown in FIG. 2 in an "unshrunken" state (prior to application of heat thereto), with the inner thermoplastic tube 22 being loosely fitted around the optical fiber 10, and with the outer heat shrink tube 26 being loosely fitted around the stainless steel strength member 24 and the inner thermoplastic tube 22. It is to be appreciated that following application of sufficient heat, the inner thermoplastic tube 22 will soften and/or melt to more closely conform to the exterior of the optical fiber 10, and the outer heat shrink tube 26 will contract around the stainless steel strength member 24 and the inner thermoplastic tube 22. The purpose of the integrated strength member is to resist bending and enhance tensile strength, thereby enhancing reliability of a splice—particularly when an optical fiber containing the splice needs to be coiled in a tight space (such as in module or cable assembly applications).

Another exemplary heat shrink protection sleeve 30 used to protect a splice joint 52 formed between two coated optical fibers 10A, 10B is schematically illustrated in FIGS. 3A and 3B. The heat shrink protection sleeve 30 includes a generally cylindrical inner tube 34 (e.g., a melt flow adhesive material such as ethylene vinyl acetate (EVA)) and a generally cylindrical outer tube 36 (e.g., a polyolefin and/or PTFE), wherein the outer tube 36 generally surrounds the inner tube 34, and the inner tube 34 defines an interior passage 40. The outer tube 36 is required for conventional heat shrink protection sleeves because the melt flow adhesive material (e.g., EVA) has a very high viscosity and a very low softening temperature (typically only about 100° C.). To ensure that the inner tube 34 wraps around the optical fibers 10A, 10B and the splice joint 30, the more temperature-resistant outer tube 36 is considered indispensable, particularly when the splice is intended for operation over a high temperature range of up to about 85° C.

In use, the heat shrink protection sleeve 30 is positioned over a fusion spliced section of two optical fibers 10A, 10B including a splice joint 52 arranged between (pre-stripped) glass cladding segments 14A, 14B of the respective optical fibers 10A, 10B. Upon application of heat (typically within an oven), the inner tube 34 melts around the optical fibers 10A, 10B, the glass cladding segments 14A, 14B, and the splice joint 52. The outer tube 36, which includes a cylindrical outer surface 38, may include some heat shrinking capability to help the adhesive distribute around the fused optical fibers 10A, 10B.

As the de facto splice protection technology in the fiber optics industry for decades, limitations of heat shrink protection sleeves are well known. Firstly, an operator must remember to thread (i.e., guide) an optical fiber through the heat shrink protection sleeve before fusion splicing is performed. A misstep in this process may require breaking and reworking the splice. Secondly, an optical fiber is subject to being threaded in the wrong place when the splice protector is small in diameter. If the optical fiber is in a cavity inside the outer tube but outside the inner tube (e.g., such as the inner and outer tubes 22, 26 of FIG. 2), the optical fiber will be in direct contact with the stainless steel strength member, which can weaken or break the fiber. Thirdly, curing the heat shrink protection sleeve can take at least 30 seconds, with such duration representing the longest and rate-limiting fraction of the time necessary to complete a single fusion splicing cycle. Fourthly, upon emerging from an oven, the heat shrink protection sleeve requires additional time to cool down, which further increases the time necessary to complete a fusion splicing cycle. Handling a heat shrink protected spliced fiber before it has sufficiently cooled also poses a potential safety concern. Additionally, fusion splices protected with heat shrink protection sleeves are bulky and inflexible, necessitating the use of a splice tray, module, or the like to manage the protection sleeves. This increases the cost and limits the size (i.e., miniaturization) of fiber optic components that contain fusion splices. Lastly, in cable assembly applications, a heat shrink protection sleeve requires excess jacket strip length, which requires an extra process step and extra material to protect the exposed cable after splicing.

Splice recoating is more costly and time-consuming to implement than using heat shrink protection sleeves to protect fusion splices. In a recoating process, a pre-stripped and spliced fiber section is placed in a mold with an inner diameter matching the fiber coating diameter. Typically, UV-sensitive polymer recoat material (e.g., acrylate-based material) is injected into the mold to surround the bare glass cladding of the spliced fibers, and UV light cures the polymer recoat material in place to yield a recoated optical fiber having the same cross-sectional dimension as that of the original coated fiber. As an alternative to UV curable recoating material, thermally curable polyimide material may be used for fiber splice recoating utilizing a similar mold. Fiber recoaters are manufactured by companies such as America Fujikura Ltd. (AFL) and Vytran (a division of Thorlabs, Inc.). While recoating provides benefits such as reduced size and increased flexibility relative to the use of heat shrink protection sleeves, use of recoating has been limited to high-end applications such as submarine fiber fusion splicing, mainly due to the capital cost of the recoating equipment. Conventional recoating is also not practical for field deployment. Additional drawbacks of conventional recoating processes may include the handling of chemicals, limited shelf life, and complex process steps.

Heat shrink protection sleeves have also been applied to protect optical fiber ribbon splices, which include multiple fusion splices between first and second parallel arrays of optical fibers aligned side-by-side and contained in first and second optical fiber ribbon segments, respectively. In such a context, an integrated strength member typically includes a flat surface to support the fusion spliced fiber arrays, a thermoplastic inner tube is melted around the spliced ribbon cables and the integrated strength member, and a more temperature-resistant outer tube encases the thermoplastic inner tube. Other conventional methods for overcoating ribbon splices include placing a ribbon splice in a mold, and overmolding the splice with an adhesive material such as ultraviolet curable epoxy, such as disclosed in U.S. Pat. No. 9,360,624 assigned to Corning Optical Communications LLC. Both of the foregoing processes for protecting optical fiber ribbon splices are time-consuming to implement.

In view of the foregoing, need exists in the art for improved fiber optic cable assemblies suitable for protecting one or more fusion splices between complementary single-fiber or multi-fiber cables, as well as methods for protecting such fusion splices, to address limitations associated with conventional fiber optic cable assemblies and splice protection methods.

SUMMARY OF THE DISCLOSURE

The present disclosure relates to a polymeric overcoating used as a splice protector, and a corresponding method of application where the resulting coated fusion spliced optical fibers or coated fusion spliced optical fiber ribbons can be bundled or stacked to reduce the size of splice protection.

In one embodiment, a fiber optic cable assembly is provided. The fiber optic cable assembly comprising: first and second optical fibers each including a pre-coated section and a stripped section; a fusion splice including a splice joint joining ends of the stripped sections of the first and second optical fibers; and a polymeric overcoating extending over the stripped section of each of the first and the second optical fibers, the splice joint, and at least a portion of the pre-coated section of each of the first and the second optical fibers; wherein the polymeric overcoating has an elongation at break of greater than 100% as measured by ASTM D638.

In another embodiment, wherein the polymeric overcoating has a viscosity of between 10,000 centipoise (cP) and 50,000 cP as measured by DSTM502. In another embodiment, the polymeric overcoating has a shrinkage of less than 1% as measured by ASTM D2566. In another embodiment, the polymeric overcoating has a hardness of greater than 50 Shore D as measured by ASTMD2240. In another embodiment, the polymeric overcoating has a UV curing time of between 1 second and 1 minute at a temperature of about 25° C. In another embodiment, the polymeric overcoating has a thickness off the first optical fiber and the second optical fiber of between 0.1 millimeters (mm) and 1 mm.

In one embodiment, a method for protecting fusion spliced first and second optical fibers that each include a stripped section and a pre-coated section, wherein a splice joint joins ends of the stripped sections of the first and second optical fibers, the method comprising: coating the splice joint, the stripped sections of the first and second optical fibers, and a portion of the pre-coated section of the first and second optical fibers with a polymeric overcoating; curing the polymeric overcoating; wherein curing the polymeric overcoating comprises curing under UV light at a temperature of about 25° C. for a curing time of between 1 second and 1 minute.

In another embodiment, the method further comprising: wiping a portion of the polymeric overcoating applied onto the splice joint, the stripped sections of the first and second optical fibers, and a portion of the pre-coated section of the first and second optical fibers to control a thickness of the polymeric overcoating. In another embodiment, the polymeric overcoating has a thickness off the first optical fiber and the second optical fiber between 0.1 mm and 1 mm. In another embodiment, the polymeric overcoating has an elongation at break of greater than 100% as measured by ASTM D638. In another embodiment, the polymeric overcoating has a viscosity of greater than 10,000 centipoise (cP) at a temperature of about 25° C. In another embodiment, the polymeric overcoating has a shrinkage of less than 1% as measured by ASTM D2566. In another embodiment, the polymeric overcoating has a hardness of greater than 50 Shore D as measured by ASTMD2240. In another embodiment, the method further comprising applying a furcation tube over the splice joint, the stripped sections of the first and second optical fibers, and a portion of the pre-coated section of the first and second optical fibers.

In one embodiment, a method for protecting fusion spliced optical fiber ribbons is provided. The method comprising: splicing first and second optical fiber ribbons that each include a stripped section and a pre-coated section, wherein a first splice joint joins ends of the stripped sections of the first and second optical fiber ribbons to form a first fusion spliced optical fiber ribbon; splicing third and fourth optical fiber ribbons that each include a stripped section and a pre-coated section, wherein a second splice joint joins ends of the stripped sections of the third and fourth optical fiber ribbons to form a second fusion spliced optical fiber ribbon; coating the first fusion spliced optical fiber ribbon with a first polymeric overcoating, wherein the first polymeric overcoating coats the first splice joint, the stripped sections of the first and second optical fibers, and a portion of the pre-coated section of the first and second optical fibers; coating the second fusion spliced optical fiber ribbon with a second polymeric overcoating, wherein the second polymeric overcoating coats the second splice joint, the stripped sections of the third and fourth optical fibers, and a portion of the pre-coated section of the third and fourth optical fibers; bundling the first coated fusion spliced optical fiber ribbon and the second coated fusion spliced optical fiber ribbon such that the first coated fusion spliced optical fiber ribbon and the second coated fusion spliced optical fiber ribbon are adjacent to each other; and curing the first and second polymeric overcoatings; wherein curing the first and second polymeric overcoatings comprises curing under UV light at a temperature of about 25° C. for a curing time of between 1 second and 1 minute.

In another embodiment, the method further comprising: wiping at least a portion of at least one of the first polymeric overcoating and the second polymeric overcoating. In another embodiment, the method further comprising: applying an additional polymeric overcoating onto the bundled first and second coated fusion spliced optical fiber ribbons. In another embodiment, the method further comprising: curing the additional polymeric overcoating; wherein curing the additional polymeric overcoating comprises curing under UV light at a temperature of about 25° C. for a curing time of between 1 second and 1 minute. In another embodiment, the first and second polymeric overcoatings have a thickness off at least one of the first coated fusion spliced optical fiber ribbon and the second coated fusion spliced optical fiber ribbon of between 0.1 mm and 1 mm. In another embodiment, the additional polymeric overcoating has a thickness between 0.1 mm and 1 mm. In another embodiment, the first and second polymeric overcoatings have an elongation at break of greater than 100% as measured by ASTM D638. In another embodiment, the first and second polymeric overcoatings have a viscosity of greater than 10,000 centipoise (cP) at a temperature of about 25° C. In another embodiment, the first and second polymeric overcoatings have a shrinkage of less than 1% as measured by ASTM D2566. In another embodiment, the first and second polymeric overcoatings have a hardness of greater than 50 Shore D as measured by ASTMD2240. In another embodiment, the method further comprising applying a furcation tube over the first and second splice joints, the stripped sections of the first, second, third, and fourth optical fibers, and a portion of the pre-coated section of the first, second, third, and fourth optical fibers.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 4 is a perspective view of stripped optical fibers that are fusion spliced to form a fusion spliced optical fiber;

DETAILED DESCRIPTION

Figure 2:
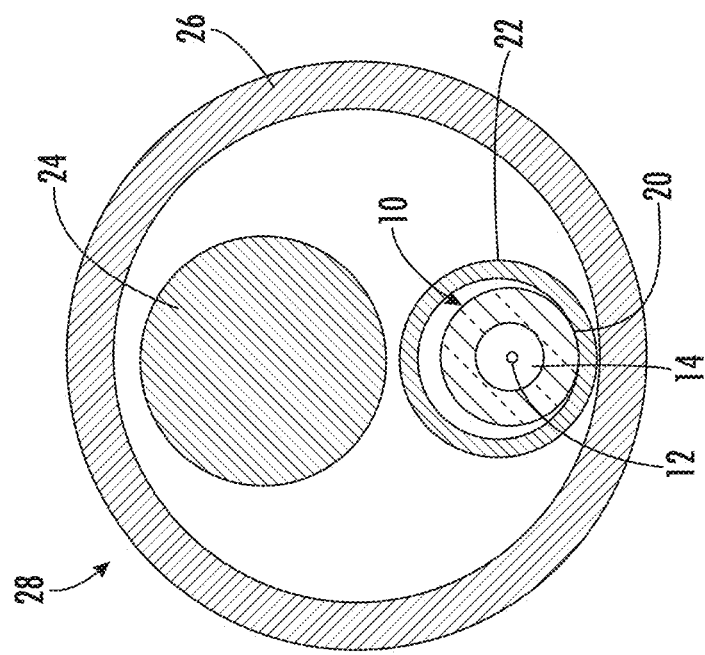
FIG. 2 is a cross-sectional view of a conventional splice protector including a heat shrink protection sleeve and an integrated strength member.
Figure 1:
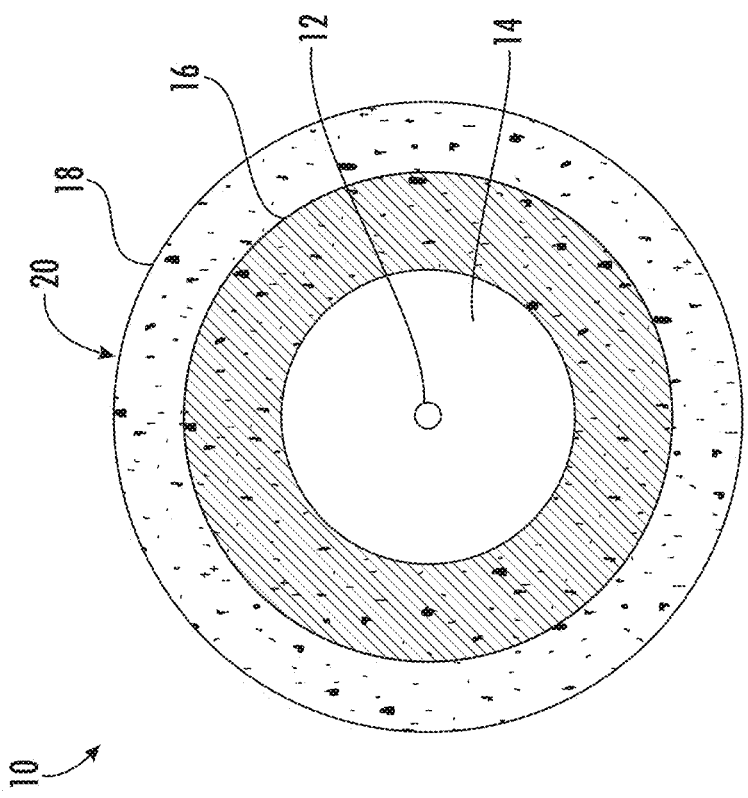
FIG. 1 is a cross-sectional view of a conventional coated optical fiber that may be subject to fusion splicing, prior to stripping of a multi-layer polymer coating from glass cladding.
Figure 3A:
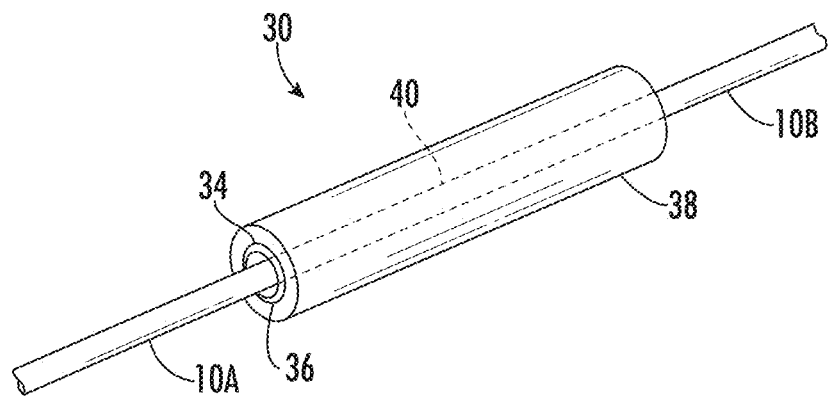
FIG. 3A is a schematic perspective view of a conventional heat shrink protection sleeve used to protect a fusion splice including a splice joint between two optical fibers.
Figure 3B:
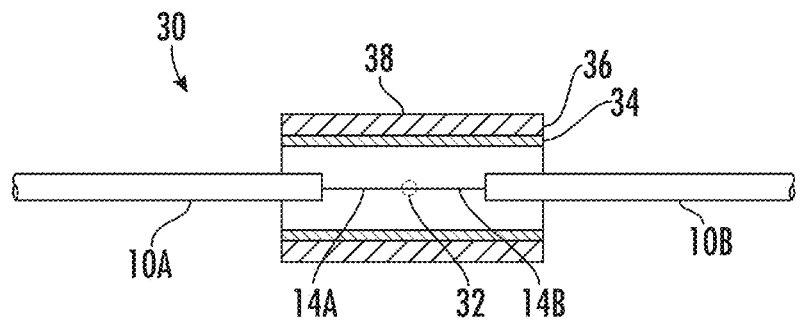
FIG. 3B is a schematic cross-sectional view of the heat shrink protection sleeve and optical fibers of FIG. 3A, with schematic illustration of the splice joint between stripped portions of the two optical fibers.

Various embodiments will be further clarified by examples in the description below. In general, the present disclosure relates to a polymeric overcoating used as a splice protector, and a corresponding method of application where the resulting coated fusion spliced optical fibers or coated fusion spliced optical fiber ribbons can be bundled or stacked to reduce the size of splice protection.

As will be discussed in more detail below, exemplary aspects relate to contacting of stripped sections and pre-coated sections of fusion spliced at least one first and at least one second optical fibers with a polymeric overcoating material, followed by curing the polymeric overcoating to form a solid overcoating arranged over a splice joint as well as stripped sections and pre-coated sections of the optical fibers. In certain embodiments, stripped sections and pre-coated sections of the at least one first and at least one second optical fibers are dipped into a pool of polymeric overcoating material, and removed. The polymeric overcoating material is then cured under radiation (e.g., ultraviolet (UV) radiation), thereby rendering it amenable to further handling.

In certain embodiments, pre-coated optical fibers subject to being fusion bonded and overcoated according to methods disclosed herein are prepared for fusion bonding (e.g., by stripping ends thereof) utilizing non-contact fiber stripping methods and/or apparatuses, such as those disclosed in U.S. Pat. No. 9,167,626 ("the '626 patent"), which is hereby incorporated by reference. Briefly, the '626 patent discloses use of a heater configured for heating a heating region to a temperature above a thermal decomposition temperature of at least one coating of an optical fiber, a securing mechanism for securely positioning a lengthwise section of the optical fiber in the heating region, and a controller operatively associated with the heater and configured to deactivate the heater no later than immediately after removal of the at least one coating from the optical fiber. Thermal decomposition of at least one coating of an optical fiber reduces or minimizes formation of flaws in optical fibers that may be generated by mechanical stripping methods and that can reduce their tensile strength. Following stripping of at least one coating layer from the ends of the optical fibers, the bare glass ends of the optical fibers may be fusion bonded using conventional fusion bonding method steps known to those skilled in the art. Variations of the techniques disclosed in the '626 patent are disclosed in U.S. Patent Application Publication Nos. 2016/0349453 and 2017/0001224, the disclosures of which are also hereby incorporated by reference herein. Non-contact stripping methods using lasers or hot gases, are also possible in certain embodiments.

As noted previously, a solid polymeric overcoating formed by methods disclosed herein is arranged over a splice joint as well as over stripped sections and pre-coated sections of optical fibers (e.g., including at least a short distance of the pre-coated sections proximate to the stripped sections). At least a portion of the solid polymeric overcoating includes a diameter that exceeds a diameter of one or more pre-coated sections of the optical fibers. Exemplary optical fibers include 900 µm buffered fibers, although methods and cable assemblies disclosed herein may utilize optical fibers of other types and sizes (e.g., 250 µm or 200 µm coated fibers without any additional buffer layer). To avoid thermal degradation of one or more coating layers of the pre-coated sections of the optical fibers, polymeric overcoating material to be used for overcoating should be maintained at a processing temperature below a melt temperature of the one or more coating layers. To promote formation of a suitable overcoating, the polymeric overcoating material may also be maintained at a processing temperature at which the polymeric overcoating material has an operating viscosity in a range of from about 10,000 centipoises (cps) to about 50,000 cps, or more preferably in a subrange of from about 10,000 cps to about 30,000 cps as measured by DSTM502. As used herein, "processing temperature" refers to the temperature at which polymeric overcoating is cured onto fusion spliced optical fibers. As used herein, "operating viscosity" refers to the viscosity of the polymeric material at the processing temperature.

Desirable polymeric overcoating materials differ from conventional melt flow adhesive glue sticks or typical thermoplastic materials in that they should desirably: have a medium viscosity (e.g., according to one or more of the ranges outlined above) at a processing temperature, be chemically stable at the processing temperature, have a glass transition temperature between 70° C. and 90° C., have a service temperature spanning at least a range of from −40° C. to 85° C. without suffering significant mechanical and/or optical performance degradation, exhibit strong adhesion to fiber coating layers and bare glass, be free from charring, and/or exhibit minimal to no outgassing (e.g., of volatile organic compounds and/or other constituents). A glass transition temperature is the point at which a material goes from a hard brittle state to a flexible or soft rubbery state as temperature is increased. A common method for determining glass transition temperature uses the energy release on heating in differential scanning calorimetry. If a plastic (e.g., thermoplastic) material associated with an optical fiber is exposed to a temperature below its glass transition temperature, the material will become very hard, and the optical fiber may be susceptible to micro bend losses. In certain embodiments, service temperature of a polymeric overcoating material may be determined by compliance with one or more industry standards for telecommunication fiber reliability testing, such as (but not limited to): ITU-T G.652, IED60793-2, Telcordia GR-20-CORE and TIA/EIA-492. In certain embodiments, a solid polymeric overcoating material comprises acrylate based or epoxy based UV curable compounds with additional additives.

Formation of a solid polymeric overcoating over at least a short distance of pre-coated sections of optical fibers bounding a spliced segment (e.g., at either end of stripped sections joined at a splice joint) beneficially ensures that all previously stripped (glass) sections are fully overcoated. In certain embodiments, a solid polymeric overcoating extends over a length of a pre-coated section of each of first and second optical fibers, wherein the overcoated length of each pre-coated section is in a range of from about 1 mm to about 10 mm. Additionally, since the solid polymeric overcoating may adhere to one or more coating layers of an optical fiber more readily than to (pre-stripped) exposed glass sections, provision of a solid polymeric overcoating of sufficient length to overlap at least a short distance of pre-coated sections of optical fibers bounding a spliced segment promotes more secure adhesion between the solid polymeric overcoating and the fusion spliced segment as a whole. In certain embodiments, a solid polymeric overcoating and a fusion spliced segment utilize a thermoplastic material that is devoid of additives configured to promote adhesion to glass. A solid polymeric overcoating as disclosed herein is preferably not subject to delamination during normal handling over the required service conditions and lifetime of an optical fiber assembly.

In preferred embodiments, a solid polymeric overcoating is water-resistant and serves to block moisture from reaching the splice joint and the previously stripped glass region of a fusion spliced segment of optical fibers. This is beneficial since moisture is known to chemically interact with glass cladding of optical fibers and cause expansion of micro defects in the glass, thereby leading to long-term failure of optical fibers. The solid polymeric overcoating is preferably also devoid of sharp particles (e.g., inorganic filler particles) and air bubbles.

In certain embodiments, a pool of polymeric overcoating material may be maintained in a reservoir. If desired, the reservoir may embody a length that is substantially greater (e.g., at least two times greater, three times greater, five times greater, or ten times greater) than its width, to accommodate one or more spliced segments of optical fibers. In certain embodiments, a reservoir may be trough-like in character, embodying a recess relative to a surrounding surface or peripheral edges. At least portions of a reservoir may desirably be formed in a substrate of a material that is non-reactive with the polymeric material and exhibits desired properties with respect to heat capacity and adhesion prevention. In certain embodiments, a reservoir may be formed in or on a substrate of one or more metal (e.g., stainless steel or aluminum) and/or ceramic materials, optionally anodized or overlaid with one or more adhesion prevention and/or corrosion prevention layers such as polytetrafluoroethylene or the like.

Referring first to FIG. 4, a fusion spliced optical fiber 100 is shown. As shown in FIG. 4, fusion spliced optical fiber 100 includes a bare fusion spliced section 42 of two pre-coated optical fibers 50A, 50B (also referred to simply as "coated optical fibers" in this disclosure), with a splice joint 52 joining two stripped sections 54A, 54B of the optical fibers 50A, 50B.

Figure 5:
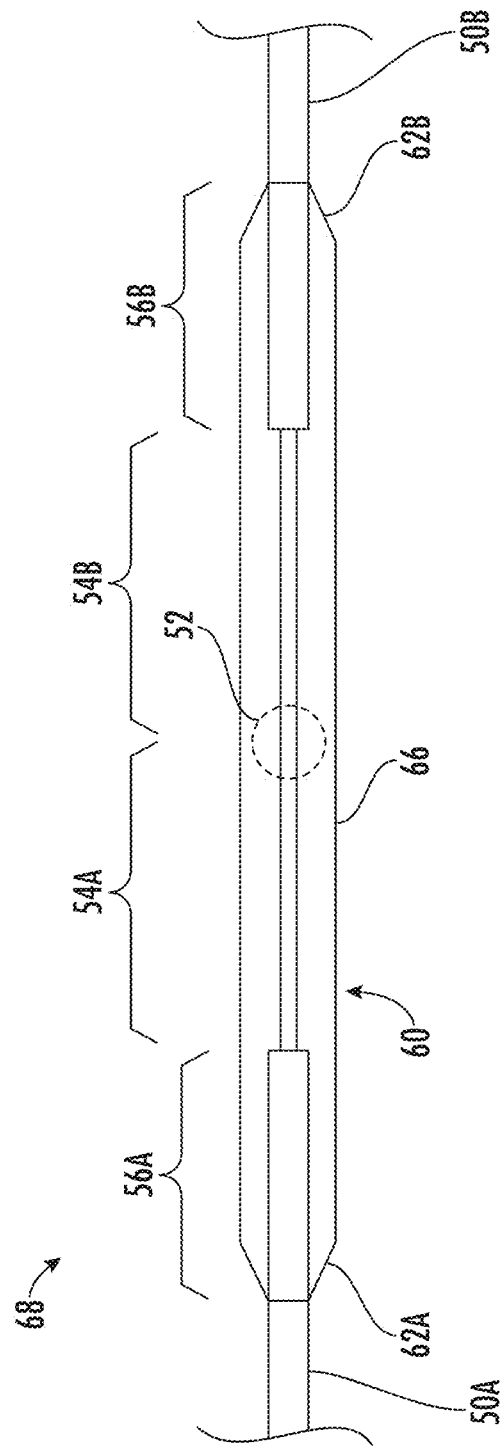
FIG. 5 is a schematic side view illustration of the fusion spliced optical fiber of FIG. 4 with an overcoating arranged over stripped sections of the first and second optical fibers, a splice joint, and pre-coated sections of the first and second optical fibers.

FIG. 5 is a schematic side view illustration of an overcoated fusion spliced section 68 of optical fibers 50A, 50B obtained by the methods of the present disclosure discussed below, wherein the solid polymeric overcoating 60 of polymeric material has a substantially constant outer diameter over the majority of its length. Each optical fiber 50A, 50B includes a coating, with portions of each optical fiber 50A, 50B being previously stripped of such coating to form stripped sections 54A, 54B embodying glass cladding. Ends of the stripped sections 54A, 54B are fusion spliced to form a splice joint 52. The solid polymeric overcoating 60 of cured gel material extends over the splice joint 52, the previously stripped sections 54A, 54B, and short lengths 56A, 56B of the coated optical fibers 50A, 50B. As shown in FIG. 5, the solid polymeric overcoating 60 may include tapered thickness ends 62A, 62B and a central section 66 having a substantially constant outer diameter that exceeds an outer diameter of the pre-coated optical fibers 50A, 50B, with the pre-coated optical fibers 50A, 50B including an outer diameter that includes that of the previously stripped sections 54A, 54B embodying glass cladding material. In some embodiments, polymeric overcoating 60 has a changing diameter over its length. For example, in some embodiments, polymeric overcoating 60 has a larger diameter at short lengths 56A, 56B and a smaller diameter at previously stripped sections 54A, 54B.

As shown in FIG. 5, at least portions of the solid polymeric overcoating 60 of cured gel material include an outer diameter that exceeds an outer diameter of the pre-coated optical fibers 50A, 50B. As mentioned above, the coated optical fibers 50A, 50B may each have a nominal outer diameter of 0.25 mm (250 µm) in some embodiments. In certain embodiments, the solid polymeric overcoating 60 cured gel material may include an outer diameter in a range that is greater than 0.25 mm, optionally bounded an upper value of about 0.9 mm in diameter. Thus, in certain embodiments, a maximum nominal outer diameter of the solid polymeric overcoating 60 may be 0.9 mm, similar to the nominal outer diameter of a 900 µm buffer layer or furcation tube layer in embodiments including such a layer. In certain embodiments, the solid polymeric overcoating 60 of cured gel material includes a minimum thickness (i.e., radial distance between an outer diameter of the pre-coated optical fibers 50A, 50B and an outer diameter of the solid polymeric overcoating 60) of at least about 25 µm, at least about 50 µm, at least about 60 µm, at least about 80 µm, or at least about 100 µm.

As mentioned previously, a solid polymeric overcoating material comprises acrylate based or epoxy based UV curable compounds with additional additives. In some embodiments, polymeric overcoating 60 has an elongation at break of greater than 100%, greater than 150% as measured by ASTM D638. In some embodiments, polymeric overcoating 60 has an elongation at break of about 200% as measured by ASTM D638. In some embodiments, polymeric overcoating 60 has a viscosity between 10,000 cP and 50,000 cP, or between 10,000 cP and 30,000 cP at a temperature as measured by DSTM502. In some embodiments, polymeric overcoating 60 has a viscosity of greater than 10,000 cP as measured by DSTM502. In some embodiments, polymeric overcoating 60 has a shrinkage of less than 1% or less than 0.70% as measured by ASTM D2566. In some embodiments, polymeric overcoating 60 has a thickness off optical fibers (i.e., radial thickness off fusion spliced optical fiber 100) between 0.1 mm and 1 mm, between 0.1 mm and 0.6 mm, or between 0.2 mm and 0.6 mm. In some embodiments, polymeric overcoating 60 has a hardness greater than 50 Shore D as measured by a shore durometer testing method such as ASTMD2240.

Advantageously, as discussed in greater detail below, the reduced thickness of polymeric overcoating 60 enables greater packaging density. Stated another way, the reduced thickness of polymeric overcoating 60 enables a greater number of optical fibers or optical fiber ribbons 100 to be bundled or stacked and thereby, be more spatially efficient.

Figure 6:
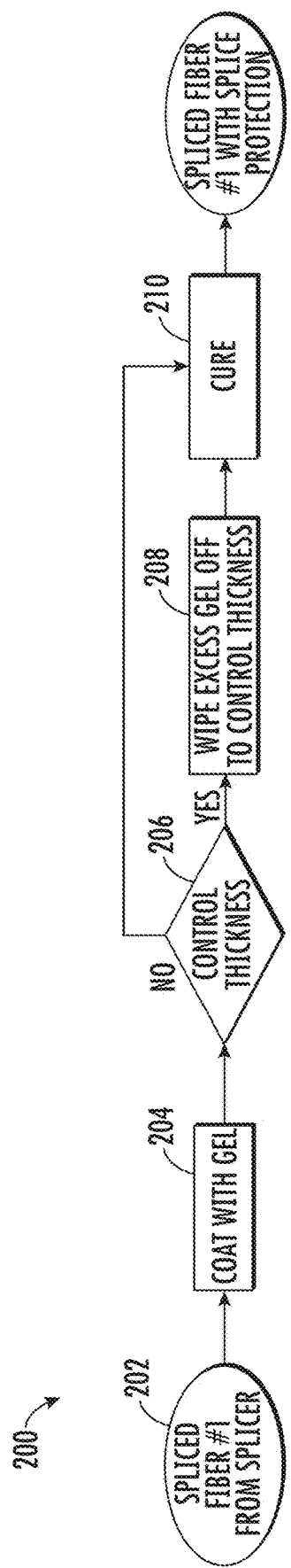
FIG. 6 is a flowchart illustrating a method of applying an overcoating onto a fusion spliced optical fiber.

Referring now to FIG. 6, a method 200 is shown. Method 200 is a method of applying polymeric overcoating 60 onto fusion spliced optical fiber 100. Method 200 begins at step 202 where fusion spliced optical fiber 100 is formed by the methods described above in the present disclosure. Once fusion spliced optical fiber 100 is formed, fusion spliced optical fiber 100 is coated in polymeric overcoating 60 as shown in step 204. In some embodiments, a bare fusion spliced section of two pre-coated optical fibers 50A, 50B (also referred to simply as "coated optical fibers" in this disclosure) with a splice joint 52 joining two stripped sections 54A, 54B of the optical fibers 50A, 50B is dipped into a reservoir defined in a substrate and containing a pool of polymeric overcoating material 60. The reservoir is recessed relative to peripheral portions of substrate. The pre-coated optical fibers 50A, 50B shown and subsequent figures may be at least 200 µm coated optical fibers in some embodiments. Thus, the pre-coated optical fibers 50A, 50B shown in the figures may have an outer diameter of at least about 200 Linn in some embodiments. Stated differently, the pre-coated optical fibers 50A, 50B may each have a nominal outer diameter of at least 200 µm in some embodiments. The term "nominal outer diameter" in this disclosure refers to the stated value for the outer diameter of the element in question (e.g., the pre-coated optical fibers 50A, 50B in this instance) and/or a commonly-accepted value for an actual value of the outer diameter of the element in question. In some embodiments, sections of the pre-coated optical fibers 50A, 50B that are not shown in the figures may include a buffer layer or furcation tube layer (i.e., an additional coating layer) that brings the nominal outer diameter to 900 µm. Additionally, in some embodiments, the stripped sections 54A, 54B each have a nominal outer diameter of 125 µm, or another desired value, such as 80 µm, 100 µm, 150 µm, etc.

At least a central portion of the fusion spliced section 42 (including the stripped sections 54A, 54B, and splice joint 52, and at least short lengths of the coated optical fibers 50A, 50B) is immersed in the pool of polymeric overcoating material 60 at a desired processing temperature. Thereafter, the portion of the fusion spliced section 42 that was immersed in the pool of polymeric overcoating material 60 is removed from reservoir at a speed (or removal rate) that preferably takes into account the operating viscosity of the polymeric overcoating material 60 to provide a desired overcoating thickness.

Referring back to method 200 of FIG. 6, after fusion spliced optical fiber 100 is coated with polymeric overcoating 60, method 200 moves to step 206 where it is determined whether the thickness of polymeric overcoating of coated fusion spliced optical fiber 100 needs to be controlled. If the thickness of polymeric overcoating 60 does not need to be controlled, then method 200 moves to step 210 where polymeric overcoating 60 is cured as discussed below. If the thickness of polymeric overcoating 60 needs to be controlled, then method 200 moves to step 208 where excess material of polymeric overcoating 60 is removed by processing polymeric overcoating 60 through a fixture (e.g., mold or die) according to methods known in the art to achieve the desired thickness.

After steps 206 and/or step 208, method 200 moves to step 210 where polymeric overcoating 60 is cured to form coated fusion spliced optical fibers 101. In some embodiments, polymeric overcoating 60 is cured at specific wavelengths such as ultraviolet radiation. In some embodiments, polymeric overcoating 60 is cured at a wavelength between 200 nm and 500 nm. In some embodiments, polymeric overcoating 60 is cured at a temperature of about 25° C. (i.e., at or about room temperature). In some embodiments, polymeric overcoating 60 is cured for a duration ranging between 1 second and 1 minute, between 1 second and 30 seconds, or between 1 second and 20 seconds.

Figure 7:
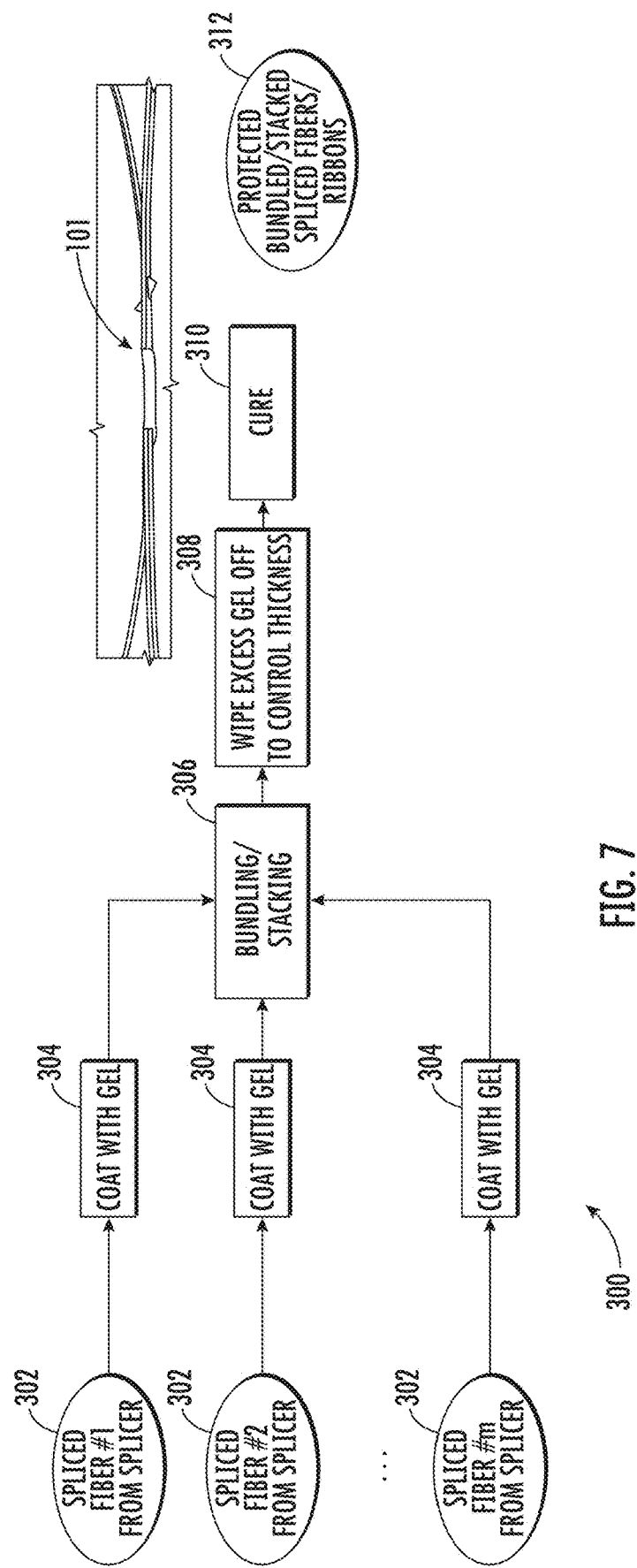
FIG. 7 is a flowchart illustrating a method of applying multiple overcoatings onto multiple fusion spliced optical fibers.

Referring now to FIG. 7, a method 300 is shown. Method 300 is a method of applying polymeric overcoating 60 onto multiple fusion spliced optical fibers 100 and bundling or stacking multiple fusion spliced optical fibers 100. Method 300 begins at step 302 where fusion spliced optical fibers 100 are individually formed by the methods described above in the present disclosure. Once fusion spliced optical fibers 100 are formed, fusion spliced optical fibers 100 are each individually coated in polymeric overcoating 60 as shown in step 304. In some embodiments, a bare fusion spliced section 42 of two pre-coated optical fibers 50A, 50B (also referred to simply as "coated optical fibers" in this disclosure) with a splice joint 52 joining two stripped sections 54A, 54B of the optical fibers 50A, 50B is dipped into a reservoir defined in a substrate and containing a pool of polymeric overcoating material 60. The reservoir is recessed relative to peripheral portions of substrate. The pre-coated optical fibers 50A, 50B shown and subsequent figures may be at least 200 µm coated optical fibers in some embodiments. Thus, the pre-coated optical fibers 50A, 50B shown in the figures may have an outer diameter of at least about 200 µm in some embodiments. Stated differently, the pre-coated optical fibers 50A, 50B may each have a nominal outer diameter of at least 200 µm in some embodiments. The term "nominal outer diameter" in this disclosure refers to the stated value for the outer diameter of the element in question (e.g., the pre-coated optical fibers 50A, 50B in this instance) and/or a commonly-accepted value for an actual value of the outer diameter of the element in question. In some embodiments, sections of the pre-coated optical fibers 50A, 50B that are not shown in the figures may include a buffer layer or furcation tube layer (i.e., an additional coating layer) that brings the nominal outer diameter to 900 µm. Additionally, in some embodiments, the stripped sections 54A, 54B each have a nominal outer diameter of 125 µm, or another desired value, such as 80 µm, 100 µm, 150 µm, etc.

At least a central portion of the fusion spliced section 42 (including the stripped sections 54A, 54B, and splice joint 52, and at least short lengths of the coated optical fibers 50A, 50B) is immersed in the pool of polymeric overcoating material 60 at a desired processing temperature. Thereafter, the portion of the fusion spliced section 42 that was immersed in the pool of polymeric overcoating material 60 is removed from the reservoir at a speed (or removal rate) that preferably takes into account the operating viscosity of the polymeric overcoating material 60 to provide a desired overcoating thickness.

Referring back to method 300 of FIG. 7, after fusion spliced optical fibers 100 are coated with polymeric overcoating 60, method 300 moves to step 306 where coated fusion optical fibers 100 are bundled or stacked together as shown in corresponding images 306A, 306B (of step 306) of method 300. Then, method 300 moves to step 308 where excess material of polymeric overcoating 60 is removed by processing polymeric overcoating 60 through a fixture (e.g., mold or die) according to methods known in the art to achieve the desired thickness.

After step 308, method 300 moves to step 310 where polymeric overcoating 60 is cured to form coated, bundled or stacked fusion spliced optical fibers. In some embodiments, polymeric overcoating 60 is cured at specific wavelengths such as ultraviolet radiation. In some embodiments, polymeric overcoating 60 is cured at a wavelength between 200 nm and 500 nm. In some embodiments, polymeric overcoating 60 is cured at a temperature of about 25° C. (i.e., at or about room temperature). In some embodiments, polymeric overcoating 60 is cured for a duration ranging between 1 second and 1 minute, between 1 second and 30 seconds, or between 1 second and 20 seconds.

Figures 8, 8A:
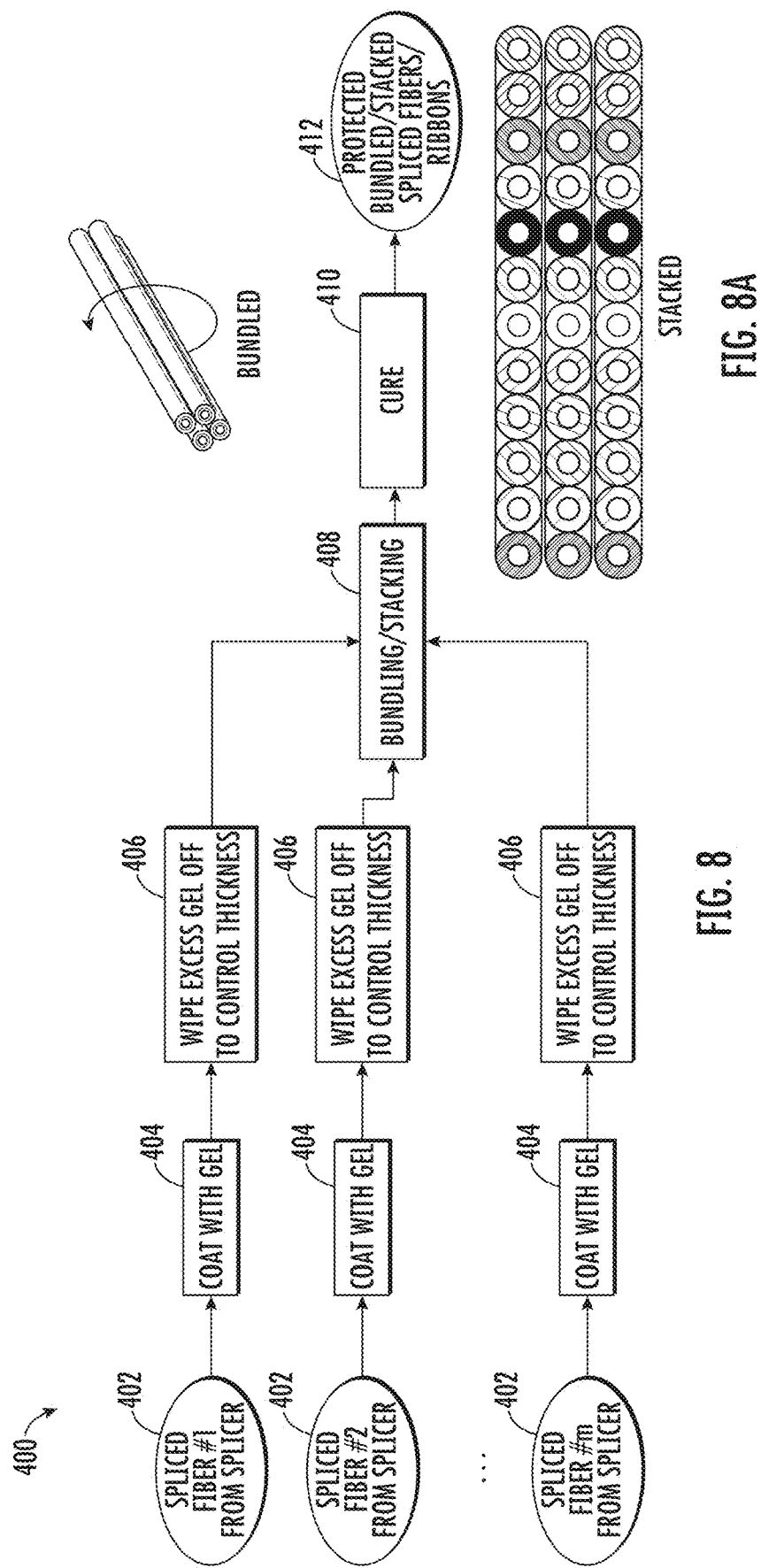
FIG. 8 is a flowchart illustrating another method of applying multiple overcoatings onto multiple fusion spliced optical fiber ribbons.
FIG. 8A is a cross sectional view of bundled or stacked, coated optical fiber ribbons.

Referring now to FIG. 8, a method 400 is shown. Method 400 is a method of individually applying polymeric overcoating 60 onto individual fusion spliced optical fiber ribbons 100 and bundling or stacking multiple fusion spliced optical fiber ribbons 100. Method 400 begins at step 402 where fusion spliced optical fiber ribbons 100 are individually formed by the methods described above in the present disclosure. Once fusion spliced optical fiber ribbons 100 are formed, fusion spliced optical fiber ribbons 100 are each individually coated in polymeric overcoating 60 as shown in step 404. As mentioned previously, a bare fusion spliced section 42 of two pre-coated optical fibers (or optical fiber ribbons) 50A, 50B (also referred to simply as "coated optical fibers" in this disclosure) with a splice joint 52 joining two stripped sections 54A, 54B of the optical fibers (optical fiber ribbons) 50A, 50B is dipped into a reservoir defined in a substrate and containing a pool of polymeric overcoating material 60. The reservoir is recessed relative to peripheral portions of substrate. The pre-coated optical fibers (or pre-coated optical fiber ribbons) 50A, 50B shown and subsequent figures may be at least 200 µm coated optical fibers in some embodiments. Thus, the pre-coated optical fibers (or pre-coated optical fiber ribbons) 50A, 50B shown in the figures may have an outer diameter of at least about 200 µm in some embodiments. Stated differently, the pre-coated optical fibers (or pre-coated optical fiber ribbons) 50A, 50B may each have a nominal outer diameter of at least 200 µm in some embodiments. The term "nominal outer diameter" in this disclosure refers to the stated value for the outer diameter of the element in question (e.g., the pre-coated optical fibers 50A, 50B in this instance) and/or a commonly-accepted value for an actual value of the outer diameter of the element in question. In some embodiments, sections of the pre-coated optical fibers (or optical fiber ribbons) 50A, 50B that are not shown in the figures may include a buffer layer or furcation tube layer (i.e., an additional coating layer) that brings the nominal outer diameter to 900 µm. Additionally, in some embodiments, the stripped sections 54A, 54B each have a nominal outer diameter of 125 µm, or another desired value, such as 80 µm, 100 µm, 150 µm, etc.

At least a central portion of the fusion spliced section 42 (including the stripped sections 54A, 54B, and splice joint 52, and at least short lengths of the coated optical fibers (or coated optical fiber ribbons) 50A, 50B) is immersed in the pool of polymeric overcoating material 60 at a desired processing temperature. Thereafter, the portion of the fusion spliced section 42 that was immersed in the pool of polymeric overcoating material 60 is removed from the reservoir at a speed (or removal rate) that preferably takes into account the operating viscosity of the polymeric overcoating material 60 to provide a desired overcoating thickness.

After fusion spliced optical fiber ribbons 100 are coated with polymeric overcoating 60, method 400 moves to step 406 where excess material of polymeric overcoating 60 is removed by processing polymeric overcoating 60 through a fixture (e.g., mold or die) according to methods known in the art to achieve the desired thickness. After step 406, method 400 moves to step 408 where coated fusion optical fiber ribbons 100 are bundled or stacked together (for fusion spliced optical fiber ribbons) as shown in FIG. 8A.

After step 408, method 400 moves to step 410 where polymeric overcoating 60 is cured to form coated, bundled or stacked fusion spliced optical fiber ribbons. In some embodiments, polymeric overcoating 60 is cured at specific wavelengths such as ultraviolet radiation. In some embodiments, polymeric overcoating 60 is cured at a wavelength between 200 nm and 500 nm. In some embodiments, polymeric overcoating 60 is cured at a temperature of about 25° C. (i.e., at or about room temperature). In some embodiments, polymeric overcoating 60 is cured for a duration ranging between 1 second and 1 minute, between 1 second and 30 seconds, or between 1 second and 20 seconds.

Figure 9:
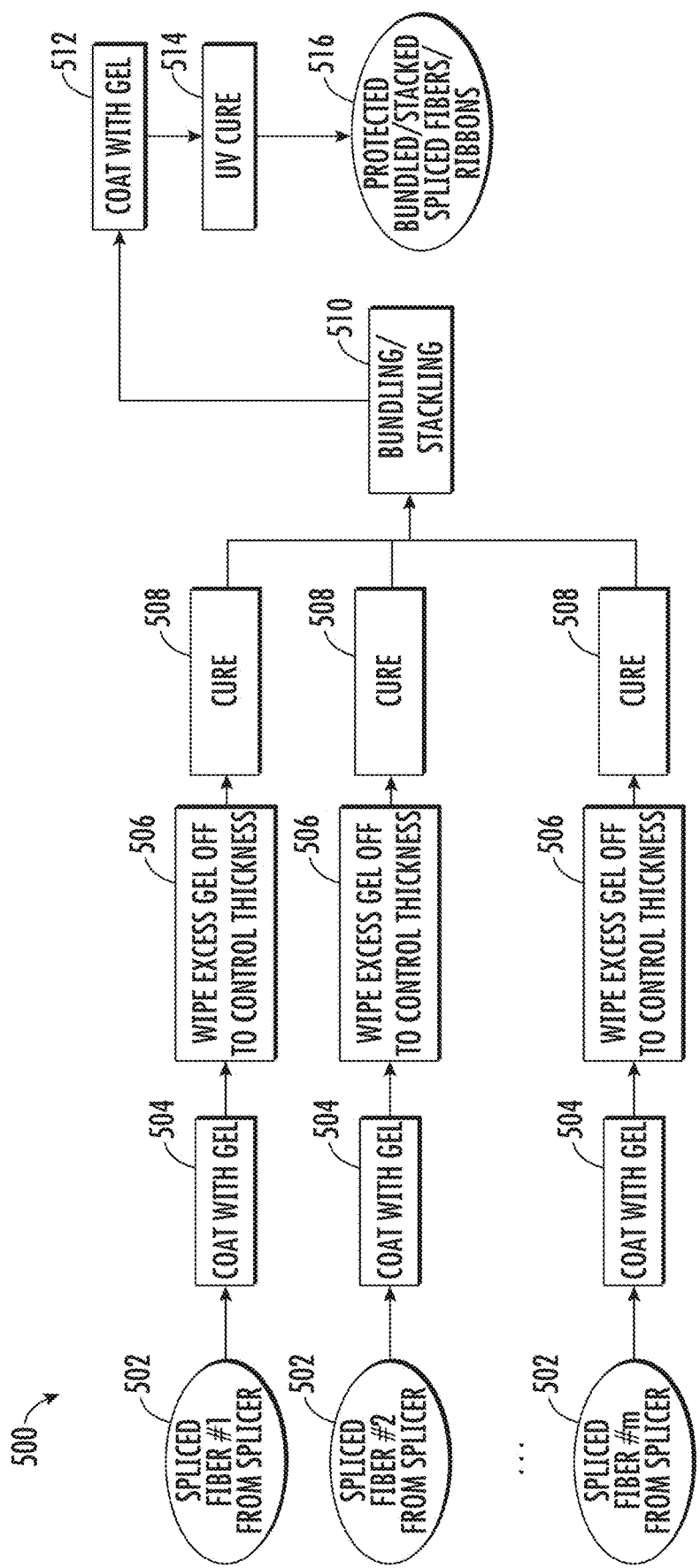
FIG. 9 a flowchart illustrating another method of applying multiple overcoatings onto multiple fusion spliced optical fiber ribbons.

Referring now to FIG. 9, a method 500 is shown. Method 500 is a method of individually applying polymeric overcoating 60 onto individual fusion spliced optical fiber ribbons 100 and bundling or stacking multiple fusion spliced optical fiber ribbons 100. Method 500 begins at step 502 where fusion spliced optical fiber ribbons 100 are individually formed by the methods described above in the present disclosure. Once fusion spliced optical fiber ribbons 100 are formed, fusion spliced optical fiber ribbons 100 are each individually coated in polymeric overcoating 60 as shown in step 504. As mentioned previously, a bare fusion spliced section 42 of two pre-coated optical fibers (or optical fiber ribbons) 50A, 50B (also referred to simply as "coated optical fibers" in this disclosure) with a splice joint 52 joining two stripped sections 54A, 54B of the optical fibers (optical fiber ribbons) 50A, 50B is dipped into a reservoir defined in a substrate and containing a pool of polymeric overcoating material 60. The reservoir is recessed relative to peripheral portions of substrate. The pre-coated optical fibers (or pre-coated optical fiber ribbons) 50A, 50B shown and subsequent figures may be at least 200 μm coated optical fibers in some embodiments. Thus, the pre-coated optical fibers (or pre-coated optical fiber ribbons) 50A, 50B shown in the figures may have an outer diameter of at least about 200 μm in some embodiments. Stated differently, the pre-coated optical fibers (or pre-coated optical fiber ribbons) 50A, 50B may each have a nominal outer diameter of at least 200 μm in some embodiments. The term "nominal outer diameter" in this disclosure refers to the stated value for the outer diameter of the element in question (e.g., the pre-coated optical fibers 50A, 50B in this instance) and/or a commonly-accepted value for an actual value of the outer diameter of the element in question. In some embodiments, sections of the pre-coated optical fibers (or optical fiber ribbons) 50A, 50B that are not shown in the figures may include a buffer layer or furcation tube layer (i.e., an additional coating layer) that brings the nominal outer diameter to 900 μm. Additionally, in some embodiments, the stripped sections 54A, 54B each have a nominal outer diameter of 125 μm, or another desired value, such as 80 μm, 100 μm, 150 μm, etc.

At least a central portion of the fusion spliced section 42 (including the stripped sections 54A, 54B, and splice joint 52, and at least short lengths of the coated optical fibers (or coated optical fiber ribbons) 50A, 50B) is immersed in the pool of polymeric overcoating material 60 at a desired processing temperature. Thereafter, the portion of the fusion spliced section 42 that was immersed in the pool of polymeric overcoating material 60 is removed from the reservoir at a speed (or removal rate) that preferably takes into account the operating viscosity of the polymeric overcoating material 60 to provide a desired overcoating thickness.

After fusion spliced optical fiber ribbons 100 are coated with polymeric overcoating 60, method 500 moves to step 506 where excess material of polymeric overcoating 60 is wiped off to achieve the desired thickness as described herein. After step 506, method 500 moves to step 508 where polymeric overcoating 60 is cured. In some embodiments, polymeric overcoating 60 is cured at specific wavelengths such as ultraviolet radiation. In some embodiments, polymeric overcoating 60 is cured at a wavelength between 200 nm and 500 nm. In some embodiments, polymeric overcoating 60 is cured at a temperature of about 25° C. (i.e., at or about room temperature). In some embodiments, polymeric overcoating 60 is cured for a duration ranging between 1 second and 1 minute, between 1 second and 30 seconds, or between 1 second and 20 seconds. After step 508, method 500 moves to step 510 where coated fusion optical fiber ribbons 100 are bundled or stacked together as shown and described above.

Once coated fusion spliced optical fiber ribbons 100 are bundled or stacked, coated fusion spliced optical fiber ribbons 100 are coated in polymeric overcoating 60 as shown in step 512 with methods similar to those described above. After step 512, method 500 moves to step 514 where polymeric overcoating 60 is cured to form coated, bundled or stacked fusion spliced optical fiber ribbons. In some embodiments, polymeric overcoating 60 is cured at specific wavelengths such as ultraviolet radiation. In some embodiments, polymeric overcoating 60 is cured at a wavelength between 200 nm and 500 nm. In some embodiments, polymeric overcoating 60 is cured at a temperature of about 25° C. (i.e., at or about room temperature). In some embodiments, polymeric overcoating 60 is cured for a duration ranging between 1 second and 1 minute, between 1 second and 30 seconds, or between 1 second and 20 seconds.

Figure 10:
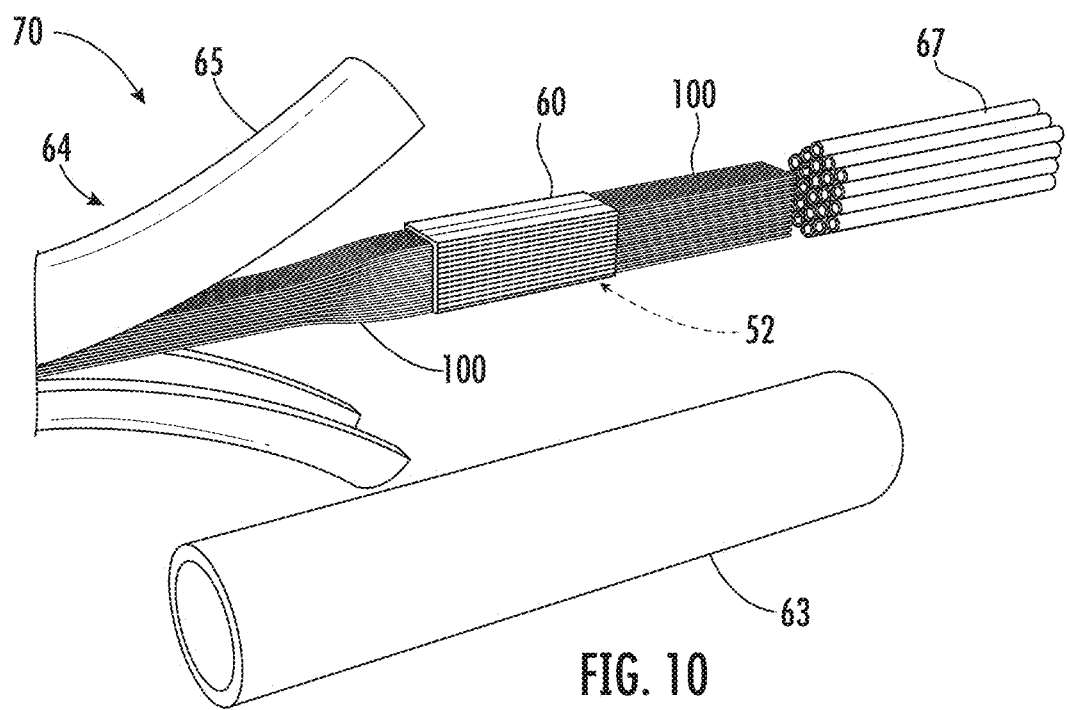
FIG. 10 is a perspective view of the fusion spliced optical fibers with the overcoating of the present disclosure with a furcation tube to be applied onto the splice joint.
Figure 13:
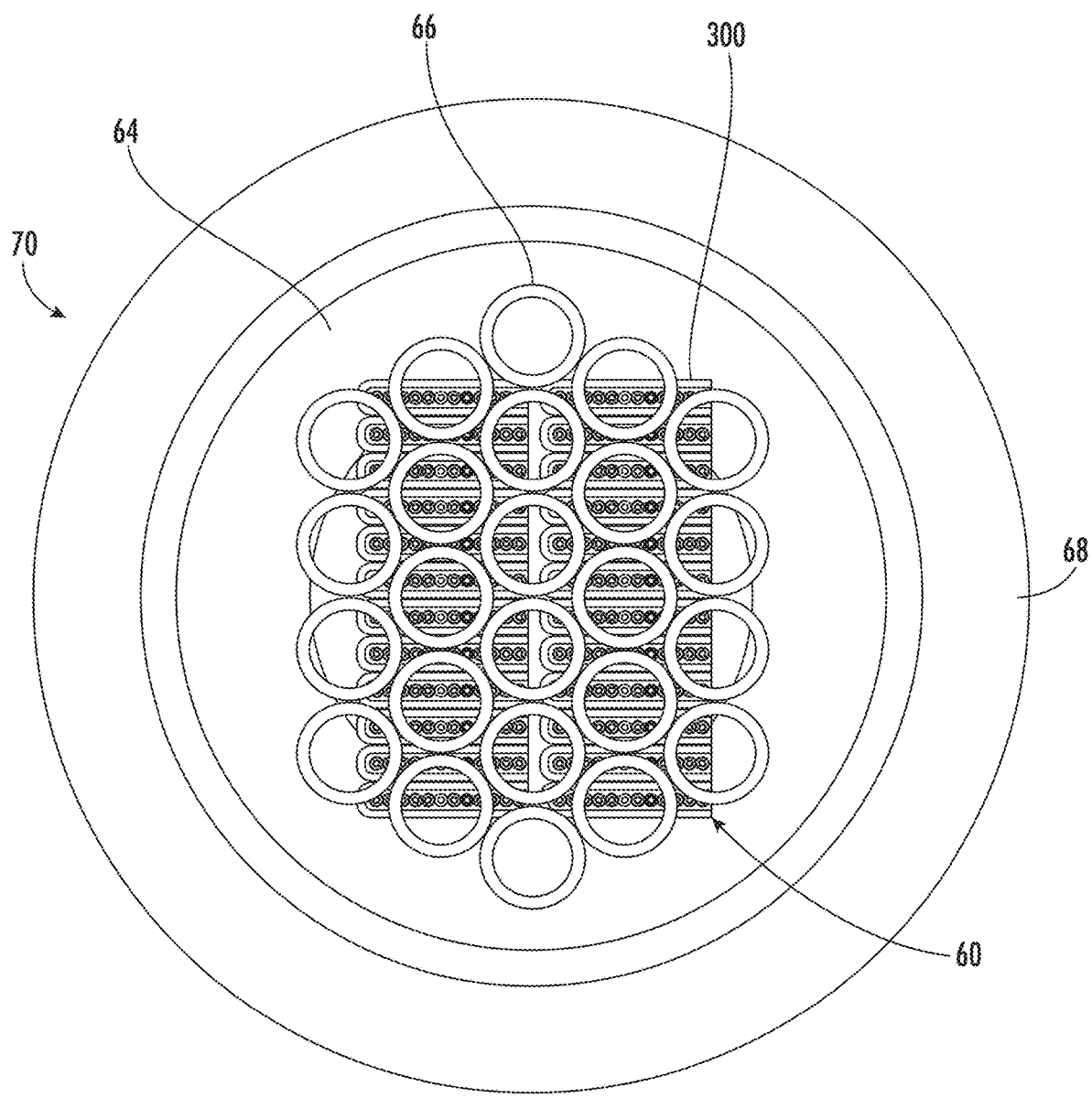
FIG. 13 is a cross sectional view of the optical fiber ribbons with the overcoatings in an optical fiber cable with a furcation tube positioned over at least the splice joint.
Figure 14:
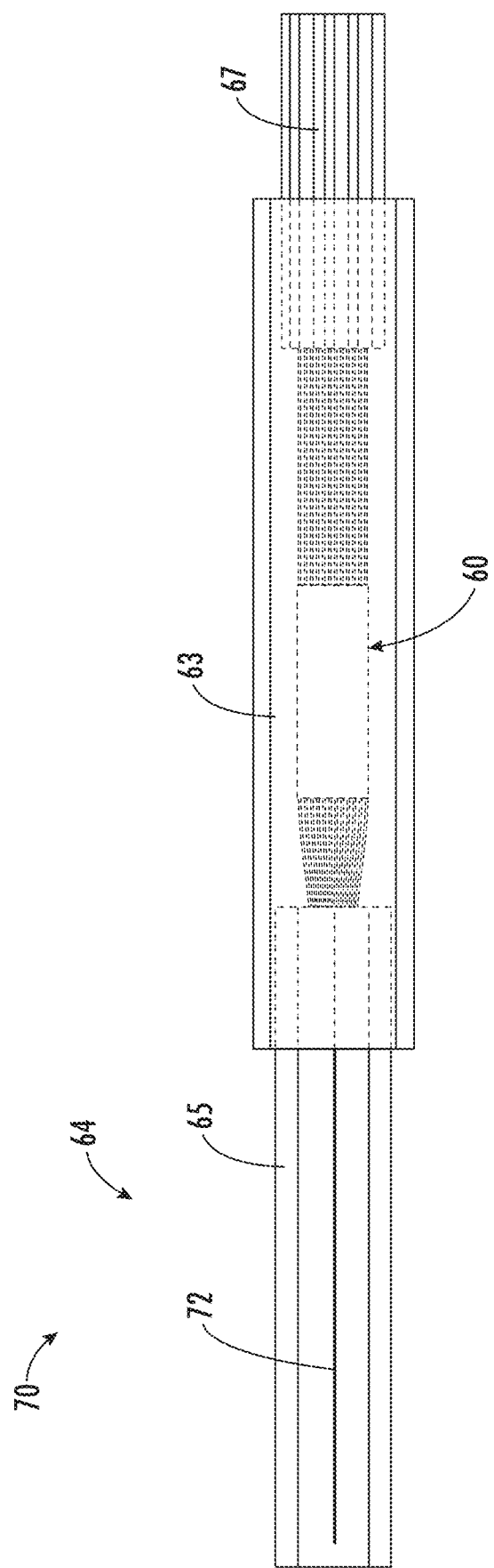
FIG. 14 is a side view of the optical fiber cable of FIG. 13 with the furcation tube applied onto the optical fiber cable.
Figure 16:
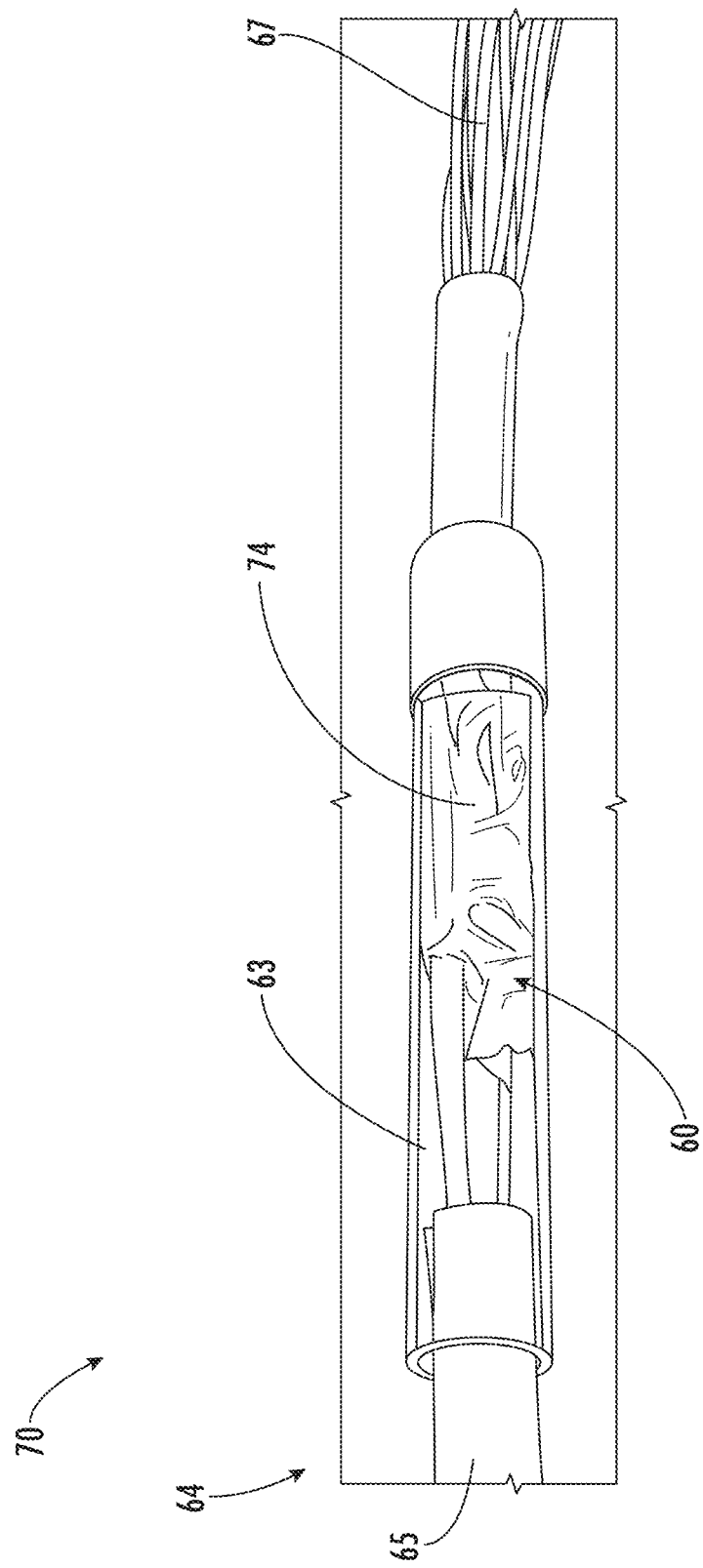
FIG. 16 is a perspective view of the furcation tube applied onto the optical fiber cable in accordance with the present disclosure.

Referring now to FIG. 10, mass fusion spliced optical fiber ribbons 100 are shown within an optical fiber cable assembly 70. As shown, one set of optical fiber ribbons 100 is housed in an optical fiber cable 64 with an optical fiber cable jacket 65, and another set of optical fiber ribbons 100 is coupled to pigtail cables 67. In such embodiments where optical fiber ribbons 100 are fusion spliced together, a splice protector or polymeric overcoating 60 is used to protect splice joint 52 between optical fiber ribbons 100 within furcation housing or furcation tube 63 (FIGS. 13, 14, and 16). In some embodiments, furcation tube 63 has a length that is less than 10 times the diameter of a bundle of pigtails 67. In some embodiments, furcation housing or furcation tube 63 is slid over splice joints 52 and polymeric overcoatings 60 and furcation tube 63 partially overlaps with optical fiber cable jacket 65 and with pigtail cables 67. In some embodiments, furcation tube 63 is injected with potting adhesives 74 (FIG. 18) to affix optical fibers 100 and polymeric overcoating 60 within furcation tube 63. In some embodiments, furcation tube 63 may be supported by spiral wraps as strain relief and a pulling grip may be integrated into furcation tube 63. In some embodiments, furcation tube 63 and the potting adhesive 74 can be replaced by low pressure molding compound applied onto splice joint 52 and a portion of optical fiber cable jacket 65 along with strength members (not shown). FIG. 10 shows a respective polymeric overcoating 60 for each splice joint 52. However, in alternate embodiments, splice joints 52 (each associated with two of optical fiber ribbons 100) may be covered by a common polymeric overcoating 60 (not shown).

The splice joint 52 within furcation tube 63 is independent of connector types used. In some embodiments, each optical fiber of optical fiber ribbons 100 exiting furcation tube 63 may be pre-terminated by a multi-fiber connector such as MTP, MPO, or expanded beam lens connectors. In some embodiments, each optical fiber of optical fiber 100 exiting furcation tube 63 may be a pre-furcated sub assembly with multiple simplex or duplex connectors. In some embodiments, each optical fiber of the optical fiber ribbons 100 may have a rectangular shape.

In the splice joint 52 of furcation tube 63, the optical fibers used in optical fiber cable 64 may be different from optical fibers exiting furcation tube 63. For instance, optical fiber cable 64 may use a small diameter optical fiber such as a 200 μm diameter fiber to improve optical fiber density within furcation tube 63, while optical fibers exiting furcation tube 63 may be standard 250 μm fibers. In another embodiment, optical fibers in optical fiber cable 64 may be SMF Ultra, and optical fibers in the furcation pigtails 67 may be LBL or ZBL fibers.

Figure 11:
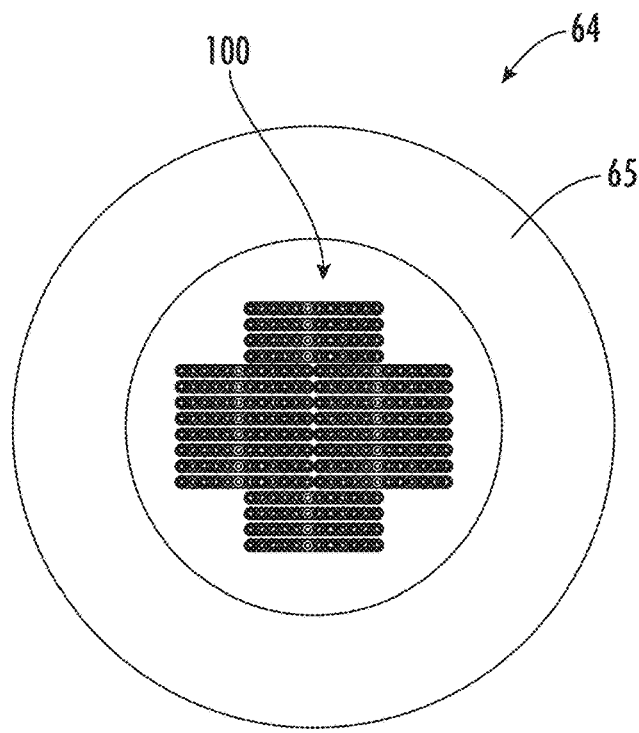
FIG. 11 is a cross sectional view of optical fiber ribbons in a stacked configuration within a cable of FIG. 10.
Figure 12:
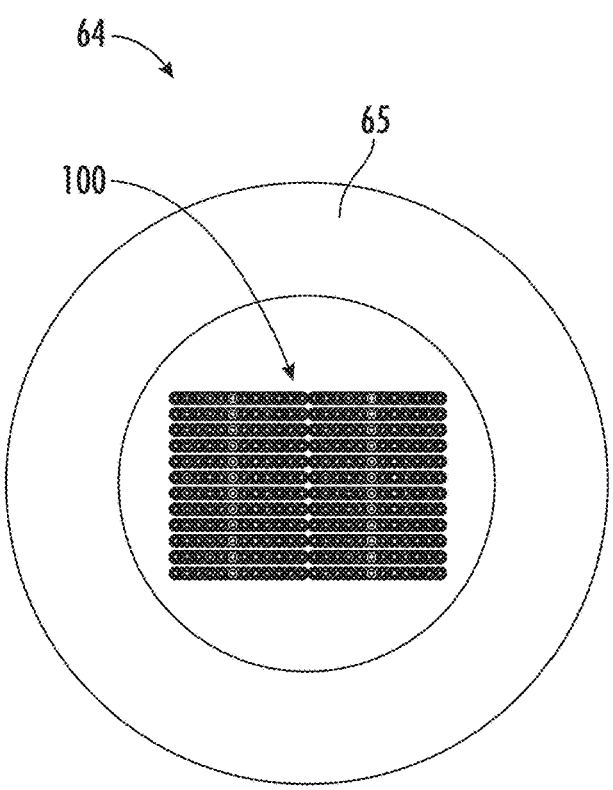
FIG. 12 is a cross sectional view of optical fiber ribbons in another stacked configuration within a cable of FIG. 11.

Referring now to FIGS. 11 and 12, various configurations of optical fiber ribbons 100 within optical fiber cable 64 are shown. As shown in FIG. 11, optical fiber ribbons 100 are arranged in four groups of optical fiber ribbons 100 within optical fiber cable 64. In some embodiments, 288 optical fibers are provided in optical fiber cable 64. However, in alternate embodiments, other suitable optical fiber counts within optical fiber cable 64 may be used. The configuration shown in FIG. 11 changes closer to splice joint 52 (FIG. 10) as shown in FIG. 12 where optical fiber ribbons 100 are stacked substantially uniformly. In some embodiments, optical fiber cable 64 comprises rollable optical fiber ribbons where rollable optical fiber ribbons are mass fusion spliced to other rollable optical fibers within furcation tube 63.

As mentioned previously, optical fiber cable 64 comprises an optical fiber cable jacket 65. As shown in FIG. 14, optical fiber cable jacket 65 has a slit 72 allowing access to optical fiber ribbons 100 within optical fiber cable 64 for mass fusion splicing as discussed above. In some embodiments, optical fiber cable jacket 65 has a pair of slits 72 to open optical fiber cable jacket 65 (by bending optical fiber cable jacket 65 backwards) as shown in FIG. 10. Access to optical fiber ribbons 100 via slit(s) 72 allows reworking of splice joint 52 without increasing the length of furcation tube 63. Slit 72 has a gap of less than 0.5 mm and a length of less than about 6 inches or about 150 mm. While slit 72 is not noticeable, labels for furcation tube 63 can be placed near the furcation tube 63 to conceal slits 72. After optical fiber ribbons 100 are processed within optical fiber cable 64, slit 72 is sealed with structural adhesive. In some embodiments, slit 72 is bonded by a structural adhesive for a length of less than 150 mm. In some embodiments, the structural adhesive has a shear strength of at least 600 psi when bonding optical fiber cable jacket 65.

Figure 15:
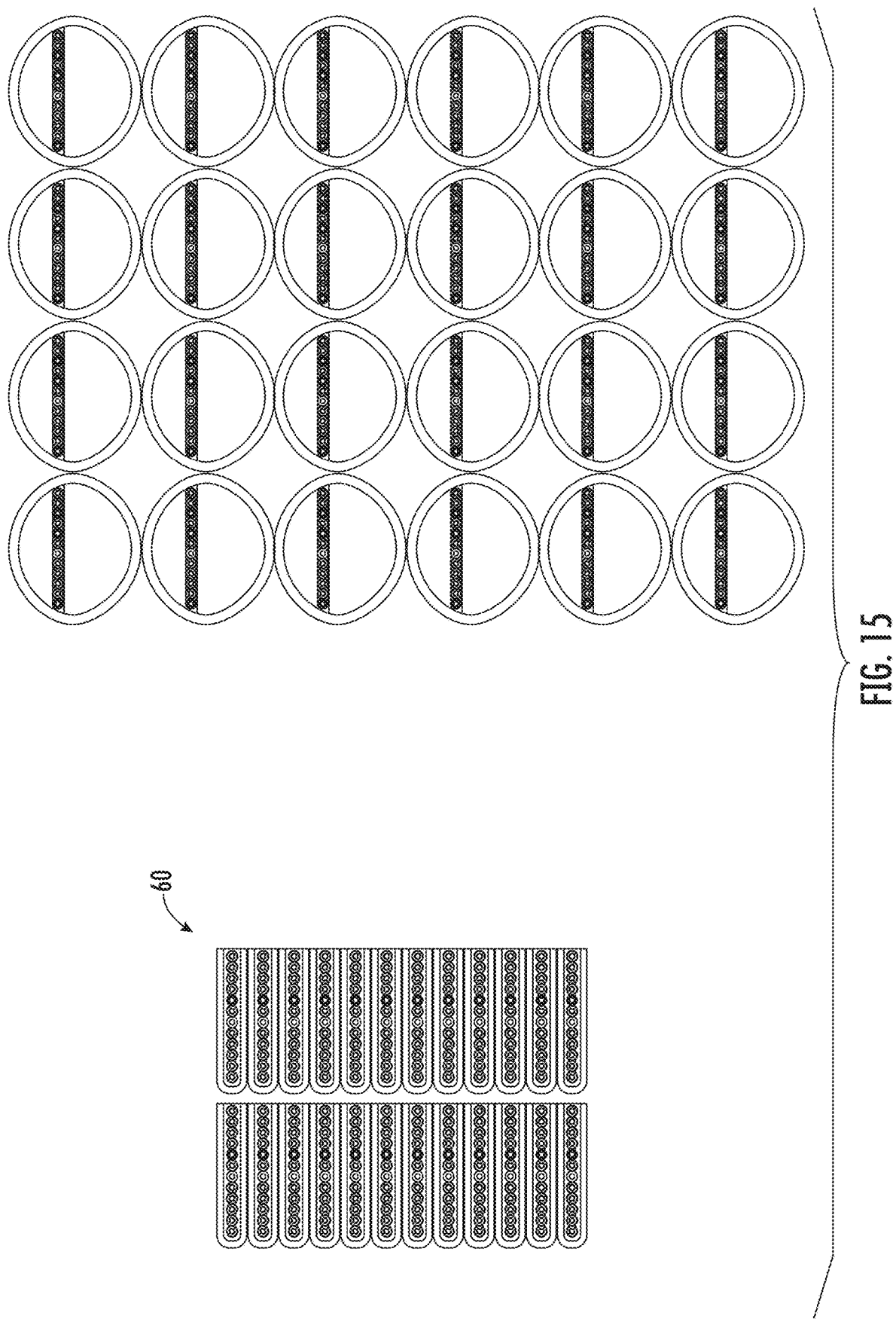
FIG. 15 is a side by side spatial comparison of conventional splice protectors applied onto optical fiber ribbons and splice protectors of the present disclosure.

Referring now to FIG. 15, a comparison of stacked or bundled coated fusion spliced optical fiber ribbons 100 with optical fiber ribbons in conventional splice protectors is provided. As mentioned previously, polymeric overcoating 60 has a reduced thickness which provides greater spatial efficiency of coated fusion spliced optical fiber ribbons 100 within furcation tube 63. As shown, conventional splice protectors have a volume that is greater than the volume of polymeric overcoating 60. In some embodiments, conventional splice protectors are about 13 times the volume of polymeric overcoating 60 as applied onto fusion spliced optical fibers 100. As such, the inner cavity of furcation tube 63 needs to be increased to accommodate the conventional splice protectors. In turn, the outer diameter of furcation tube 63 also increases and can become larger than the size of optical fiber cable 64 and may present challenges in smaller or tighter space applications (e.g., pulling through small ducts). Also, the length of furcation tube 63 is increased due to the length of the conventional splice protectors and longer transition length from optical fiber ribbons 100 to splice joints 52 and polymeric overcoating 60. Thus, the volume of furcation tube 63 is about 6 times larger than when using low profile splice protectors, such as polymeric overcoating 60, resulting in a greater consumption of potting adhesive 74 or molding compound. Stated another way, polymeric overcoating 60 provides a more spatially efficient splice protector such that coated fusion spliced optical fiber ribbons 100 can be efficiently stacked in a small cross section within furcation tube 63 such that larger components are not required. Also, due to the small cross section occupancy of bundled or stacked coated fusion spliced optical fibers 100 within furcation tube 63, fiber bending and twisting is minimized when optical fiber cable 64 transitions to splice joint 52.

EXAMPLES

Figure 17:
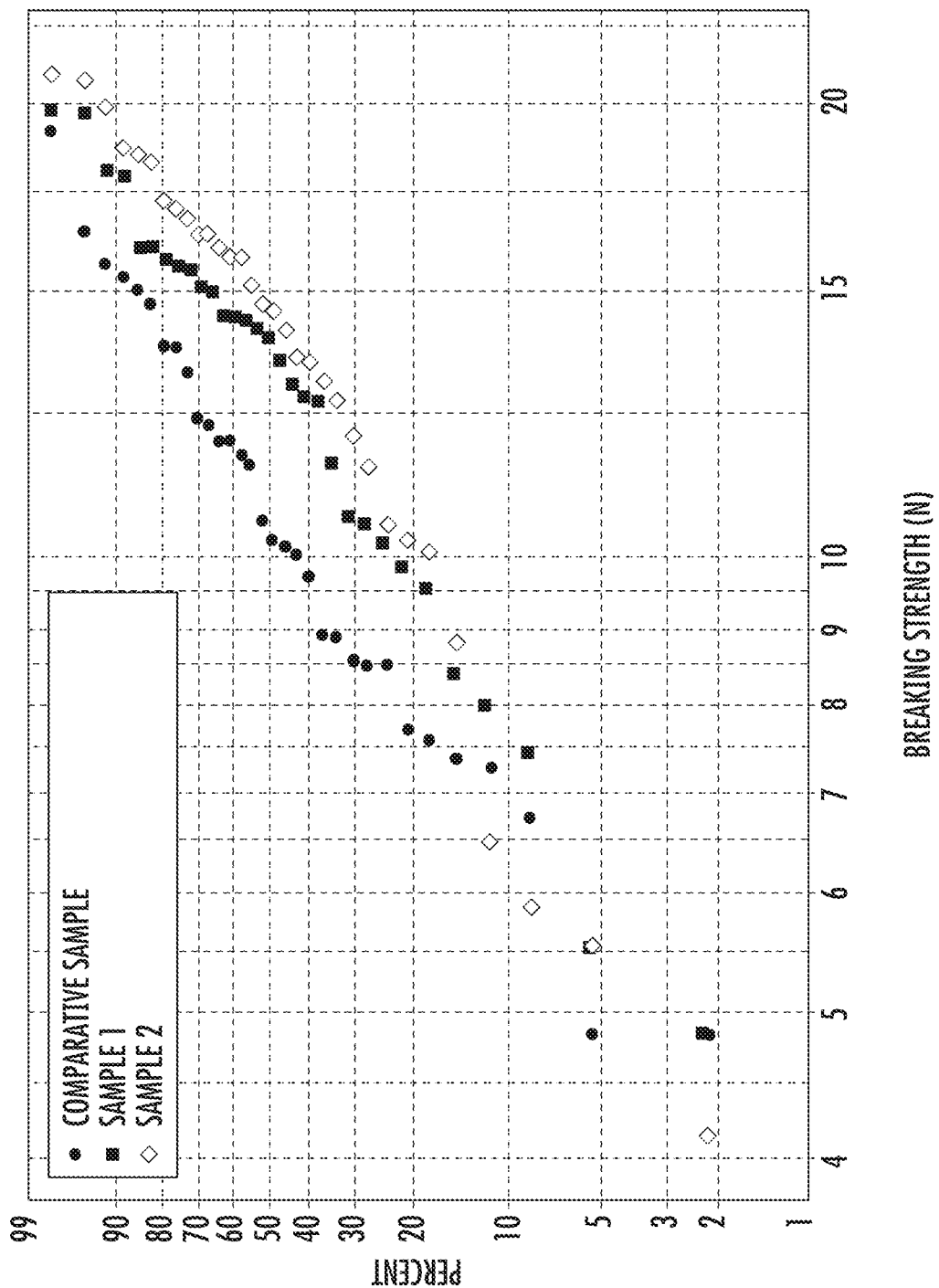
FIG. 17 relates to Example 1 and is a graph illustrating fiber strength of fusion spliced optical fibers with varying overcoatings.
Figure 18:
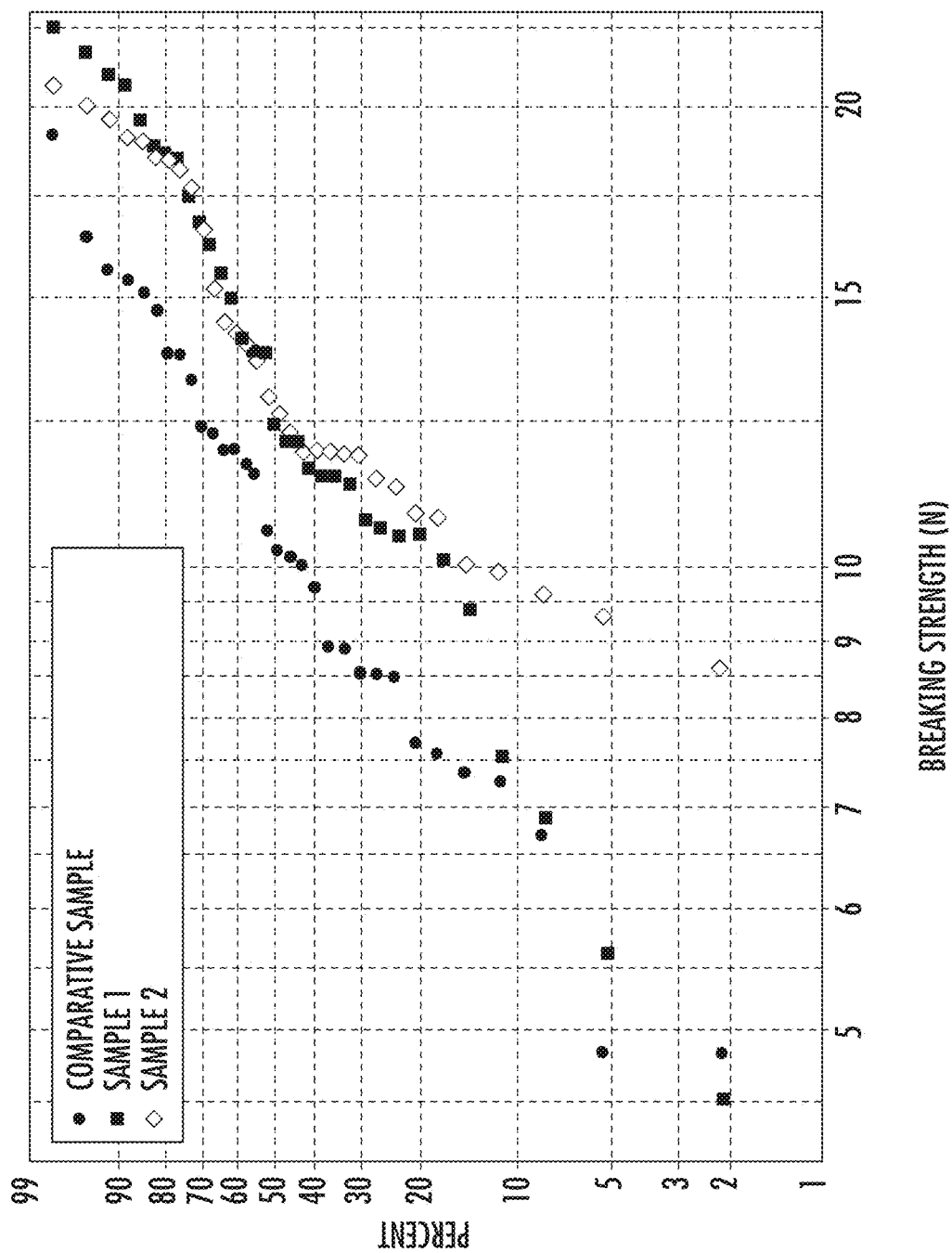
FIG. 18 relates to Example 1 and is another graph illustrating fiber strength of fusion spliced optical fibers with varying overcoatings.
Figure 19:
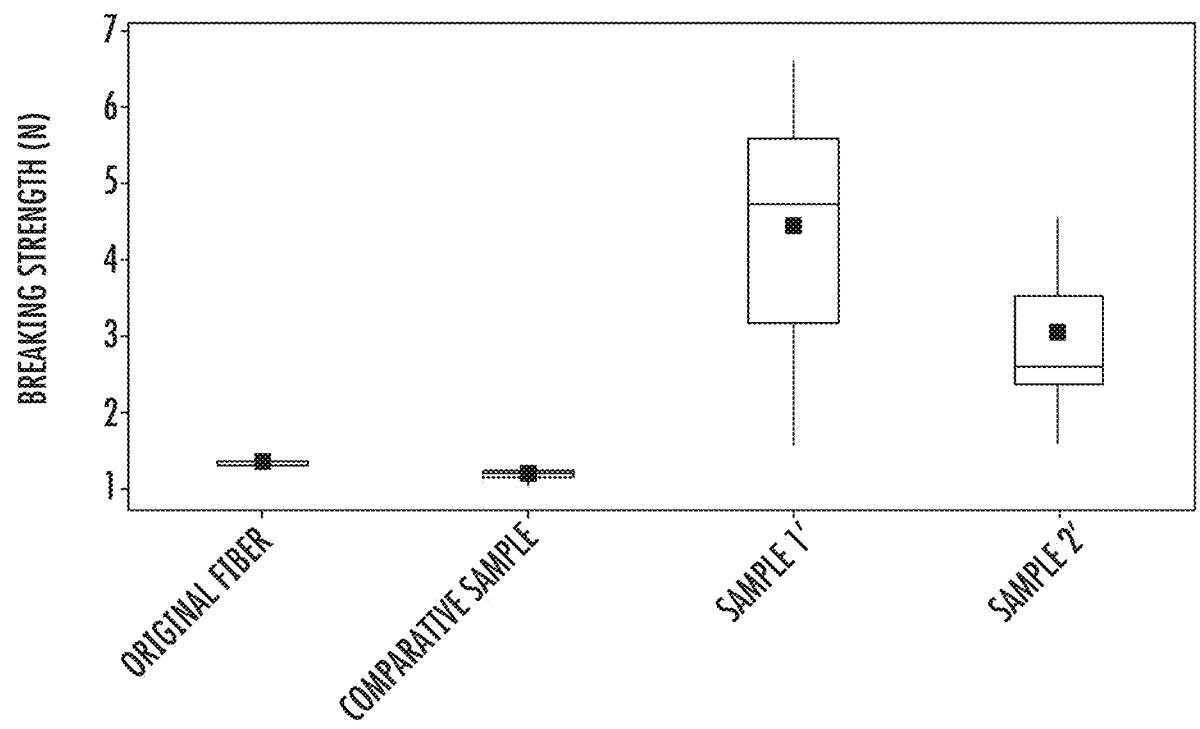
FIG. 19 relates to Example 1 and is a box and whisker plot illustrating bending strength of fusion spliced optical fibers with varying overcoatings.

FIGS. 17-19 relate to Example 1 below and illustrate physical properties of polymeric overcoating 60 as discussed above. The method described below describes sample preparation for Example 1.

To prepare optical fiber samples, optical fibers 50A, 50B were stripped, cleaned, and cleaved to 10 mm and then spliced together. Polymeric overcoating 60 was applied over the stripped fiber area and a few millimeters over the original coating of optical fibers 50A, 50B. The thickness of polymeric overcoating 60 was controlled by controlling the time to apply polymeric overcoating 60 onto the stripped sections 54A, 54B. Thick samples had polymeric overcoatings 60 that were controlled to have a thickness of about 0.6 mm, and thin samples had polymeric overcoatings 60 that were controlled to have a thickness of about 0.2 mm.

Example 1

Fiber Strength

Referring to FIG. 17, fiber/tensile strength data of Comparative Sample 1, Sample 1, and Sample 2 are provided. Comparative Sample 1 was a spliced optical fiber without a polymeric overcoating 60. Sample 1 was prepared by the method discussed above and has a thin polymeric overcoating 60. Sample 2 was prepared by the method discussed above and has a polymeric overcoating 60 with a thickness greater than the thickness of Sample 1. The fiber strength was determined by a universal test machine performing a pull test, and the test was performed at pull rate of 25 mm/min and a gauge length of 500 mm.

As shown in FIG. 17, Samples 1 and 2 provided improved fiber strength as compared to Comparative Sample 1 with Sample 2 having a greater fiber strength than Sample 1. In addition, Samples 1 and 2 show an improved fiber/tensile strength as compared to Comparative Sample 1. That is, the fusion spliced optical fibers of Samples 1 and 2 can tolerate larger applied forces without damaging the splice joint.

Bending Strength

Referring to FIG. 18, tensile strength data of Comparative Sample 1, Sample 1, and Sample 2 are provided. Comparative Sample 1 was a spliced optical fiber without a polymeric overcoating 60. Sample 1 was prepared by the method discussed above and has a thin polymeric overcoating 60. Sample 2 was prepared by the method discussed above and has a polymeric overcoating 60 with a thickness greater than the thickness of Sample 1. Bending strength was determined by a 3-point bending method. In this method, the midpoint of polymeric overcoating 60 was held by thin metal wire 0.5 mm in diameter so that sample forms a V shape as it was pulled. Very thin metal wire was utilized so that the samples failed due to the bending force. The bending test was performed with a universal test machine, and the test was performed at pull rate of 10 mm/min and a fixture distance of 300 mm.

As shown in FIG. 18, Samples 1 and 2 provided improved tensile strength as compared to Comparative Sample 1 with Sample 2 having a greater bending strength than Sample 1. In addition, Samples 1 and 2 show an improved fiber/tensile strength as compared to Comparative Sample 1. That is, the fusion spliced optical fibers of Samples 1 and 2 can tolerate larger applied forces without damaging the splice joint.

Referring to FIG. 19, bending strength data is provided for Original Fiber, Comparative Sample 1, Sample 1', and Sample 2'. Samples 1' and 2' were prepared by the method discussed above and each have thick polymeric overcoatings 60. As shown, Samples 1' and 2' provided improved bending strength as compared to Original Fiber and Comparative Sample 1. Without wishing to be held to any particular theory, it is believed that bending strength is dependent on the modulus of the polymeric overcoating 60 and is directly proportional (to a greater degree) to the diameter of the polymeric overcoating 60, so by increasing the thickness of polymeric overcoating 60, the bending strength of the coated spliced fiber will also increase, even though the modulus of the polymeric overcoating may be low.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A fiber optic cable assembly comprising:
    first and second optical fibers each including a pre-coated section and a stripped section;
    a fusion splice including a splice joint joining ends of the stripped sections of the first and second optical fibers; and
    a polymeric overcoating extending over the stripped section of each of the first and the second optical fibers, the splice joint, and at least a portion of the pre-coated section of each of the first and the second optical fibers;
    wherein the polymeric overcoating has an elongation at break of greater than 100% as measured by ASTM D638;
    wherein the polymeric overcoating has a UV curing time of between 1 second and 1 minute at a temperature of about 25° C.; and
    wherein the polymeric overcoating has a viscosity of between 10,000 centipoise (cP) and 50,000 cP as measured by DSTM502.

2. The fiber optic cable assembly of claim 1, wherein the polymeric overcoating has a shrinkage of less than 1% as measured by ASTM D2566.

3. The fiber optic cable assembly of claim 1, wherein the polymeric overcoating has a hardness of greater than 50 Shore D as measured by ASTMD2240.

4. The fiber optic cable assembly of claim 1, wherein the polymeric overcoating has a thickness off the first optical fiber and the second optical fiber of between 0.1 millimeters (mm) and 1 mm.

5. The fiber optic cable assembly of claim 1, wherein the polymeric overcoating has a viscosity of between 10,000 centipoise (cP) and 50,000 cP as measured by DSTM502 at a temperature of about 25° C.

6. A method for protecting fusion spliced first and second optical fibers that each include a stripped section and a pre-coated section, wherein a splice joint joins ends of the stripped sections of the first and second optical fibers, the method comprising:
    coating the splice joint, the stripped sections of the first and second optical fibers, and a portion of the pre-coated section of the first and second optical fibers with a polymeric overcoating;
    curing the polymeric overcoating;
    wherein curing the polymeric overcoating comprises curing under UV light at a temperature of about 25° C. for a curing time of between 1 second and 1 minute;
    wherein the polymeric overcoating has a viscosity of greater than 10,000 centipoise (cP) at a temperature of about 25° C.

7. The method of claim 6, further comprising: wiping a portion of the polymeric overcoating applied onto the splice joint, the stripped sections of the first and second optical fibers, and a portion of the pre-coated section of the first and second optical fibers to control a thickness of the polymeric overcoating.

8. The method of claim 6, wherein the polymeric overcoating has a thickness off the first optical fiber and the second optical fiber between 0.1 mm and 1 mm.

9. The method of claim 6, wherein the polymeric overcoating has an elongation at break of greater than 100% as measured by ASTM D638.

10. The method of claim 6, wherein the polymeric overcoating has a shrinkage of less than 1% as measured by ASTM D2566.

11. The method of claim 6, wherein the polymeric overcoating has a hardness of greater than 50 Shore D as measured by ASTMD2240.

12. The method of claim 6, further comprising applying a furcation tube over the splice joint, the stripped sections of the first and second optical fibers, and a portion of the pre-coated section of the first and second optical fibers.

13. A method for protecting fusion spliced optical fiber ribbons, the method comprising:
    splicing first and second optical fiber ribbons that each include a stripped section and a pre-coated section, wherein a first splice joint joins ends of the stripped sections of the first and second optical fiber ribbons to form a first fusion spliced optical fiber ribbon;
    splicing third and fourth optical fiber ribbons that each include a stripped section and a pre-coated section, wherein a second splice joint joins ends of the stripped sections of the third and fourth optical fiber ribbons to form a second fusion spliced optical fiber ribbon;
    coating the first fusion spliced optical fiber ribbon with a first polymeric overcoating, wherein the first polymeric overcoating coats the first splice joint, the stripped sections of the first and second optical fibers, and a portion of the pre-coated section of the first and second optical fibers;
    coating the second fusion spliced optical fiber ribbon with a second polymeric overcoating, wherein the second polymeric overcoating coats the second splice joint, the stripped sections of the third and fourth optical fibers, and a portion of the pre-coated section of the third and fourth optical fibers;
    bundling the first coated fusion spliced optical fiber ribbon and the second coated fusion spliced optical fiber ribbon such that the first coated fusion spliced optical fiber ribbon and the second coated fusion spliced optical fiber ribbon are adjacent to each other; and
    curing the first and second polymeric overcoatings;
    wherein curing the first and second polymeric overcoatings comprises curing under UV light at a temperature of about 25° C. for a curing time of between 1 second and 1 minute;
    wherein the first and second polymeric overcoatings have a viscosity of greater than 10,000 centipoise (cP) at a temperature of about 25° C.

14. The method of claim 13, further comprising: wiping at least a portion of at least one of the first polymeric overcoating and the second polymeric overcoating.

15. The method of claim 13, further comprising: applying an additional polymeric overcoating onto the bundled first and second coated fusion spliced optical fiber ribbons.

16. The method of claim 15, further comprising: curing the additional polymeric overcoating;
   wherein curing the additional polymeric overcoating comprises curing under UV light at a temperature of about 25° C. for a curing time of between 1 second and 1 minute.

17. The method of claim 13, wherein the first and second polymeric overcoatings have a thickness off at least one of the first coated fusion spliced optical fiber ribbon and the second coated fusion spliced optical fiber ribbon of between 0.1 mm and 1 mm.

18. The method of claim 13, wherein the additional polymeric overcoating has a thickness between 0.1 mm and 1 mm.

19. The method of claim 13, wherein the first and second polymeric overcoatings have an elongation at break of greater than 100% as measured by ASTM D638.

20. The method of claim 13, wherein the first and second polymeric overcoatings have a shrinkage of less than 1% as measured by ASTM D2566.

21. The method of claim 13, wherein the first and second polymeric overcoatings have a hardness of greater than 50 Shore D as measured by ASTMD2240.

22. The method of claim 13, further comprising applying a furcation tube over the first and second splice joints, the stripped sections of the first, second, third, and fourth optical fibers, and a portion of the pre-coated section of the first, second, third, and fourth optical fibers.

* * * * *

UNITED STATES PATENT AND TRADEMARK OFFICE
CERTIFICATE OF CORRECTION

PATENT NO. : 11,886,009 B2
APPLICATION NO. : 17/481626
DATED : January 30, 2024
INVENTOR(S) : Anil Bastola et al.

It is certified that error appears in the above-identified patent and that said Letters Patent is hereby corrected as shown below:

In the Claims

In Column 19, Line 45, in Claim 4, delete "off" and insert -- of --.

In Column 20, Line 8, in Claim 8, delete "off" and insert -- of --.

In Column 21, Line 8, in Claim 17, delete "off" and insert -- of --.

Signed and Sealed this
Fourth Day of June, 2024

Katherine Kelly Vidal
*Director of the United States Patent and Trademark Office*